United States Patent
Lee et al.

(10) Patent No.: US 11,363,650 B2
(45) Date of Patent: Jun. 14, 2022

(54) FIFTH GENERATION (5G) GLOBAL UNIQUE TEMPORARY IDENTITY (GUTI) REALLOCATION FOR CELLULAR-INTERNET OF THINGS (CIOT)

(71) Applicant: QUALCOMM INCORPORATED, San Diego, CA (US)

(72) Inventors: Soo Bum Lee, San Diego, CA (US); Adrian Edward Escott, Reading (GB); Mahmoud Watfa, St-Leonard (CA); Anand Palanigounder, San Diego, CA (US); Luis Fernando Brisson Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 16/948,506

(22) Filed: Sep. 21, 2020

(65) Prior Publication Data
US 2021/0105837 A1 Apr. 8, 2021

Related U.S. Application Data

(60) Provisional application No. 62/911,202, filed on Oct. 4, 2019.

(51) Int. Cl.
*H04M 11/00* (2006.01)
*H04W 4/00* (2018.01)
(Continued)

(52) U.S. Cl.
CPC .......... *H04W 76/11* (2018.02); *H04L 1/1685* (2013.01); *H04W 4/70* (2018.02); *H04W 8/26* (2013.01);
(Continued)

(58) Field of Classification Search
CPC ....... H04W 76/11; H04W 4/70; H04W 76/27; H04W 8/26; H04W 68/005; H04L 1/1685
(Continued)

(56) References Cited

U.S. PATENT DOCUMENTS

2018/0324869 A1* 11/2018 Phuyal .................. H04W 72/14
2019/0104553 A1*  4/2019 Johansson ................. H04L 1/12
(Continued)

OTHER PUBLICATIONS

Hisilicon H., "System Level Impacts of CIoT MT-EDT", 3GPP Draft, 3GPP TSG-SA2 Meeting #135, S2-1909226, Discussion on System Level Impacts of CIoT MT-EDT, 3rd Generation Partnership Project (3GPP), Mobile Competence Centre, 650, Route Des Lucioles, F-06921 Sophia-Antipolis Cedex, vol. SA, WG2, No. Split, Croatia, Oct. 14, 2019-Oct. 18, 2019, Oct. 4, 2019 (Oct. 4, 2019), XP051801433, 5 Pages, Retrieved from the Internet: URL: https://ftp.3gpp.org/Meetings_3GPP_SYNC/SA2/Docs/S2-1909226.zip. [retrieved on Oct. 4, 2019] the whole document.
(Continued)

*Primary Examiner* — Mark G. Pannell
(74) *Attorney, Agent, or Firm* — Haynes and Boone, LLP

(57) ABSTRACT

Wireless communications systems and methods related to globally unique temporary identity (GUTI) reallocation for cellular-Internet of thing (CIoT) are provided. A user equipment (UE) receives, from a network, a paging associated with a mobile-terminated early data transmission (MT-EDT). The UE transmits, by the UE to the network, a data request in response to the paging. The UE receives, from the network in response to the data request, a message including a global unique temporary identifier (GUTI) and at least one of data associated with the paging or a connection release indication.

30 Claims, 13 Drawing Sheets

(51) Int. Cl.
  *H04W 76/11* (2018.01)
  *H04W 4/70* (2018.01)
  *H04L 1/16* (2006.01)
  *H04W 68/00* (2009.01)
  *H04W 76/27* (2018.01)
  *H04W 8/26* (2009.01)
(52) U.S. Cl.
  CPC ......... *H04W 68/005* (2013.01); *H04W 76/27* (2018.02)
(58) Field of Classification Search
  USPC .......................................................... 455/403
  See application file for complete search history.

(56) References Cited

U.S. PATENT DOCUMENTS

2019/0342800 A1* 11/2019 Sirotkin ................ H04W 76/27
2021/0022185 A1* 1/2021 Fujishiro ........... H04W 36/0055
2021/0298085 A1* 9/2021 Lee ....................... H04W 76/27

OTHER PUBLICATIONS

International Search Report and Written Opinion—PCT/US2020/052069—ISA/EPO—dated Dec. 15, 2020.
Qualcomm Incorporated: "5G CIoT MT-EDT Discussion", 3GPP Draft, S2-2002014, 3rd Generation Partnership Project (3GPP), Mobile Competence Centre, 650, Route Des Lucioles, F-06921 Sophia-Antipolis Cedex, France, vol. SA WG2, No. Elbonia, Feb. 24, 2020-Feb. 27, 2020, Feb. 18, 2020 (Feb. 18, 2020), XP051855406, 6 Pages, Retrieved from the Internet: URL: https://ftp.3gpp.org/tsg_sa/WG2_Arch/TSGS2_137e_Electronic/Docs/S2-2002014.zip. [retrievea on Feb. 18, 2020] the whole document.
Qualcomm Incorporated: "5G-GUTI Allocation in MT-EDT Precedure", 3GPP Draft, SA WG2 Meeting #136, S2-1911720, 3rd Generation Partnership Project (3GPP), Mobile Competence Centre, 650, Route Des Lucioles, F-06921 Sophia-Antipolis Cedex, France, vol. SA WG2, No. Reno, USA, Nov. 18, 2019-Nov. 22, 2019, Nov. 8, 2019 (Nov. 8, 2019), XP051821797, 3 Pages, Retrieved from the Internet: URL: https://ftp.3gpp.org/tsg_sa/WG2_Arch/TSGS2_136_Reno/Docs/S2-1911720.zip. [retrieved on Nov. 8, 2019] the whole document.
Qualcomm Incorporated: "Discussion on Mobile Terminated Early Data Transfer", 3GPP Draft, 3GPP TSG CT WG1 Meeting #119, C1-194158, 3rd Generation Partnership Project (3GPP), Mobile Competence Centre, 650, Route Des Lucioles, F-06921 Sophia-Antipolis Cedex, France, vol. CT, WG1, No. Wroclaw (Poland), Aug. 26, 2019-Aug. 30, 2019, Aug. 19, 2019 (Aug. 19, 2019), XP051762785, 7 Pages, Retrieved from the Internet: URL: http://www.3gpp.org/ftp/tsg_ct/WG1_mm-cc-sm_ex-CN1/TSGC1_119_Wroclaw/Docs/C1-194158.zip. [retrieved on Aug. 19, 2019] 1. Introduction 2 .1.2 MT EDT for CP CIoT Optimization with Msg4 option 2.1.2 MT EDT for UP CIoT Optimization with Msg4 option figures 2, 4 2.3 Applicability of MT EDT in 5GC.

* cited by examiner

FIFTH GENERATION (5G) GLOBAL UNIQUE TEMPORARY IDENTITY (GUTI) REALLOCATION FOR CELLULAR-INTERNET OF THINGS (CIOT)

CROSS REFERENCE TO RELATED APPLICATIONS

The present application claims priority to and the benefit of U.S. Provisional Patent Application No. 62/911,202, filed Oct. 4, 2019, which is hereby incorporated by reference in its entirety as if fully set forth below and for all applicable purposes.

TECHNICAL FIELD

This present disclosure is directed to wireless communication systems and methods. Certain aspects can enable and provide techniques for globally unique temporary identity (GUTI) reallocation (e.g., in cellular-Internet of thing (CIoT) networks).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Additionally, NR or 5G is designed to improve UE identity privacy.

When a UE is subscribed to a network, the network may provide the UE with a subscription permanent identifier (SUPI). During initial network registration, the network may authenticate the UE based on the SUPI. The UE may use a public key of a home public land mobile network (PLMN) to encrypt the SUPI prior to transmission over-the-air. Upon a successful authentication, the network may assign the UE with a GUTI. The UE may use the GUTI to identify itself to the network in subsequent communications as long as the UE is registered to the network. One advantage of using the GUTI for UE identification is that the GUTI can uniquely identify the UE in the network without having the UE to transmit the SUPI over-the-air, and thus may improve UE identity privacy. To provide further UE identity protection, the network may reallocate or refresh the UE GUTI frequently. The network may define certain triggering events for refreshing a UE GUTI.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, including receiving, by a user equipment (UE) from a network, a paging associated with a mobile-terminated early data transmission (MT-EDT); transmitting, by the UE to the network, a data request in response to the paging; and receiving, by the UE from the network in response to the data request, a message including a global unique temporary identifier (GUTI); and at least one of data associated with the paging or a connection release indication.

In an additional aspect of the disclosure, a method of wireless communication, including transmitting, by a core network entity to a base station (BS), a paging for a user equipment (UE) associated with a first global unique temporary identifier (GUTI); receiving, by the core network entity from the BS, a request associated with at least one of a service or a context resumption of the paged UE; and transmitting, by the core network entity to the BS in response to the request, a message including a second GUTI for the paged UE different from the first GUTI; and at least one of data associated with the paging or a connection release indication.

In an additional aspect of the disclosure, a method of wireless communication, including receiving, by a base station (BS) from a user equipment (UE), a data request associated with paging; transmitting, by the BS to a core network in response to the data request, a request associated with a service or a context resumption of the UE; receiving, by the BS from the core network in response to the request associated with the service or the context resumption of the UE, a message including a global unique temporary identifier (GUTI) and a connection release indication; and transmitting, by the BS to the UE, a connection release message including the GUTI.

In an additional aspect of the disclosure, a user equipment (UE) including a transceiver configured to receive, from a network, a paging associated with a mobile-terminated early data transmission (MT-EDT); transmit a data request in response to the paging; and receive, from the network in response to the data request, a message including a global unique temporary identifier (GUTI); and at least one of data associated with the paging or a connection release indication.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
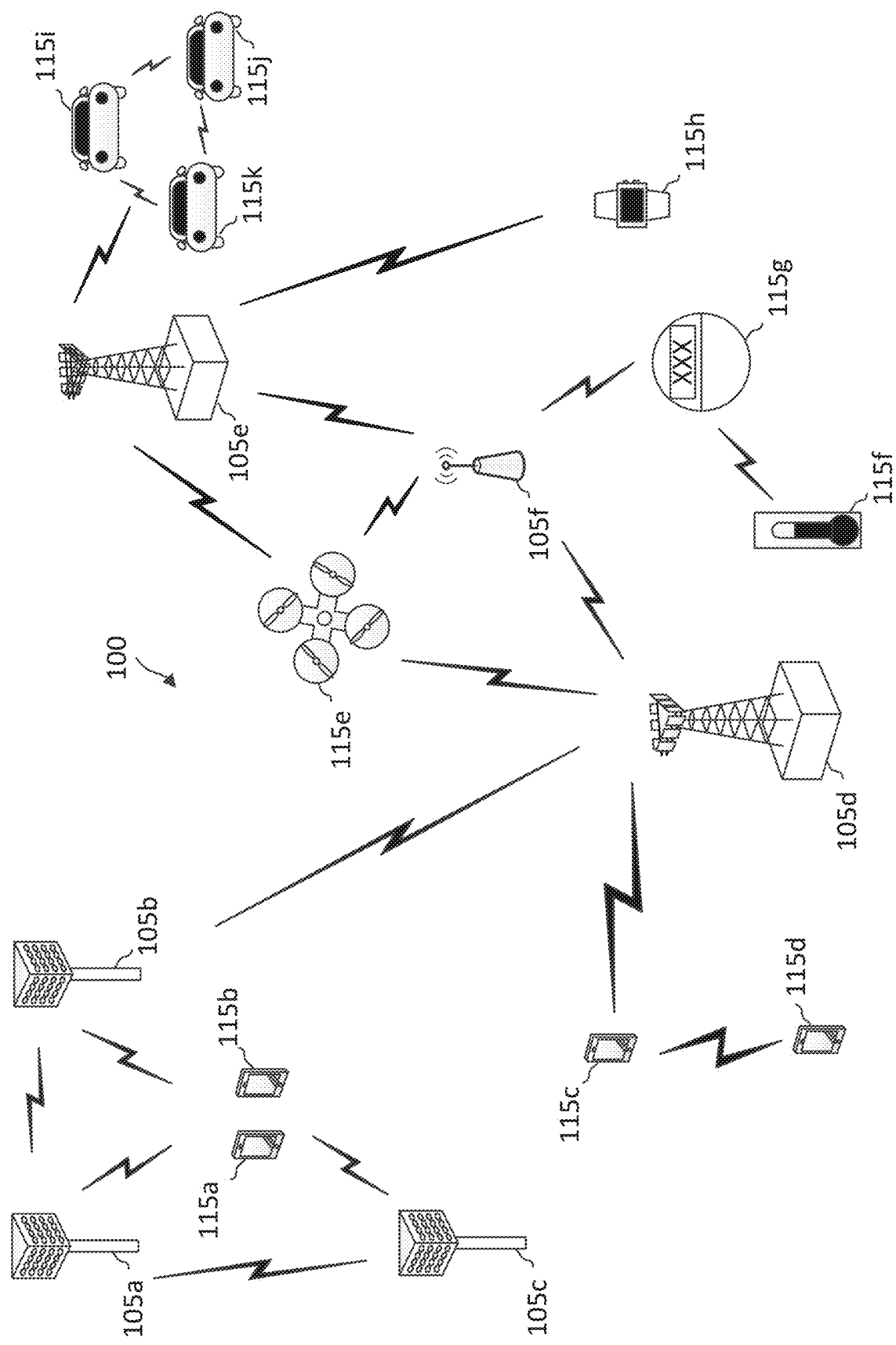
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

To provide a subscriber user equipment (UE) with identity privacy, a network may assign the UE with a globally unique temporary identity (GUTI) based on a successful authentication of the UE based on the UE's subscription permanent identifier (SUPI). The network may allocate or reallocate a UE with a new GUTI from time to time based on certain triggering events. For instance, the network may allocate the UE with a new GUTI upon receiving a registration request message from the UE indicating an initial registration, a mobility registration update, and/or a periodic registration update. Additionally, the network may allocate a UE with a new GUTI upon receiving a service request message from the UE triggered by a paging event.

Mobile-terminated early data transmission (MT-EDT) control plane (CP) and MT-EDT user plane (UP) procedures can be optimized to provide data transfer to UEs in a very short duration during a paging event, for example, with a minimum number of message exchange between the UE and the network. MT-EDT CP refers to the transfer of data over a control plane during a paging event. MT-EDT UP refers to the transfer of data over a user plane during a paging event. In the context of a 5G core network, during a MT-EDT CP, data can be transported from an access and mobility management function (AMF) component in the 5G core to a serving base station (BS) of a corresponding UE. During a MT-EDT UP, data can be transported from a 5G core user plane function (UPF) component to a serving BS of a correspond UE. For instance, in a MT-EDT CP, a UE may exchange four messages (e.g., a physical random access channel (PRACH) preamble, a random access response, a radio resource control (RRC) early data request message, and a RRC early data completion message) with the network, where data associated with paging is carried in the RRC early data completion message. Similarly, in a MT-EDT UP, a UE may exchange four messages (e.g., a PRACH preamble, a random access response, a RRC connection resume request message, and a RRC connection release message) with the network, where data associated with paging is carried in the RRC connection release message. Similar MT-EDT CP and/or MT-EDT UP can be applied to an evolved packet system (EPS) (i.e., a 4G network), where a mobility management entity (MME) replaces the AMF and a serving-gateway (S-GW)/packet-data-network-gateway (P-GW) replaces the UPF.

GUTI reallocation is typically performed using a UE configuration update (UCU) procedure, where non-access stratum (NAS) messages are exchanged between a UE and a corresponding AMF. The typical UCU procedure may not be suitable for use with MT-EDT CP or MT-EDT UP procedure to reallocate a UE with a new GUTI as the additional UCU procedure may counteract the benefit of the MT-EDT CP and MT-EDT UP optimization.

The present application describes mechanisms for GUTI reallocation in MT-EDT CP or MT-EDT UP optimized procedures without utilizing a UCU procedure. The disclosed embodiments utilize messages in the current MT-EDT CP or MT-EDT UP to carry a new GUTI for a UE. For example, the network may include a new GUTI for a UE in a RRC early data complete message or in a RRC connection release message that are currently being exchanged during a MT-EDT CP or a MT-EDT UP. To provision for the new GUTI to be sent via a RRC early data complete message or a RRC connection release message, the message flow between a 5G core AMF and a BS in a current MT-EDT CP or MT-EDT UP may be modified to include GUTI signaling.

In some aspects, during a MT-EDT CP, when a UE is paged, the UE may transmit a RRC early data request message including a NAS control plane service request (CPSR). A serving BS may forward the NAS CPSR to an AMF serving the UE. The AMF may transmit, to the serving BS, a DL NAS transport message including a NAS service accept message carrying DL data associated with the paging event and a new GUTI for the UE. The DL NAS transport message may include a release indication. The DL NAS transport message is a message exchanged between a BS and an AMF over a N2 interface. Thus, the DL NAS transport message may be referred to as a N2 DL NAS transport message. The serving BS may transmit a RRC early data complete message including the NAS service accept message to the paged UE, where the NAS service accept message includes the data and the new GUTI. In some aspects, the AMF may additionally include a NAS acknowledgement (ACK) request in the NAS service accept message to trigger the UE to send an ACK after receiving the NAS service accept message and the new GUTI.

In some aspects, during a MT-EDT CP, the AMF may include NAS service accept message including the data, a separate GUTI information element (IE) including the new GUTI, and a release indication in a N2 DL NAS transport message. The serving BS may transmit a RRC early data complete message including the NAS service accept message (carrying the data) and the GUTI IE to the paged UE. In some aspects, the AMF may additionally include an ACK request in the N2 DL NAS transport message and the BS may include the ACK request in the RRC early data complete message.

In some aspects, during a MT-EDT CP, the AMF may transmit, to the serving BS, a UE context release message including the GUTI IE instead of modifying the NAS service accept message or the DL NAS message. The UE context release message may instruct the serving BS to send the GUTI IE to the paged UE and release the RRC connection. The BS may transmit a RRC early data complete message carrying the NAS accept message as in the current MT-EDT CP and subsequently transmit a RRC connection release message including the GUTI IE to the UE.

In some aspects, during a MT-EDT UP, when a UE is paged, the UE may transmit a RRC context resume request to a serving BS. The serving BS may transmit a UE context resume request to a serving AMF. The AMF may respond by transmitting a UE context resume response including a GTUI IE for the paged UE. The UE context resume response may instruct the serving BS to send the GTUI IE to the paged UE and release the connection. The UPF may forward DL data associated with the paging to the BS over a user plane. The BS transmit a RRC connection release message including the GUTI IE and the DL data to the paged UE.

Aspects of the present disclosure can provide several benefits. For example, the inclusion of a new GUTI in current MT-EDT CP and/or MT-EDT UP messages eliminate the need for an additional UCU procedure to be included in the MT-EDT CP and/or MT-EDT UP procedures. As such, the disclosed embodiments can efficiently provide a paged UE with a new GUTI with a minimal the number of messages exchanged between the UE and the network. Accordingly, the disclosed embodiments can preserve the benefit of MT-EDT CP and/or MT-EDT UP optimization.

The disclosed embodiments are suitable for use with fourth-generation (4G) BS, which may be referred to as an evolved node B (eNB), connected to a 5G core network or a fifth generation (5G) BS, which may be referred to as a next generation eNB (gNB) connected to a 5G core network. While the disclosed embodiments are described in the context of a 5G core network and may refer to the GUTI as a 5G-GUTI, the disclosed embodiments can be applied to a 4G core network connecting to a 4G eNB or a 5G gNB. Mechanisms for GUTI reallocation with MT-EDT CP and/or MT-EDT UP procedures are described in greater detail herein.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an eNB, a gNB, an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, after establishing a connection with the BS 105, the UE 115 may initiate an initial network attachment or registration procedure with the network 100. The BS 105 may coordinate with various network entities or fifth generation core (5GC) entities, such as an AMF and a UPF, to complete the network attachment procedure. For instance, the BS 105 may coordinate with the network entities in the 5GC to identify the UE 115, authenticate the UE 115, and/or authorize the UE 115 for sending and/or receiving data in the network 100. When the UE 115 has no active data communication with the BS 105 after the network attachment, the UE 115 may return to an idle state (e.g., an RRC idle state). Mechanisms for performing network attachment, registration, and/or idle mode operations are described in greater detail below in FIG. 2.

Figure 2:
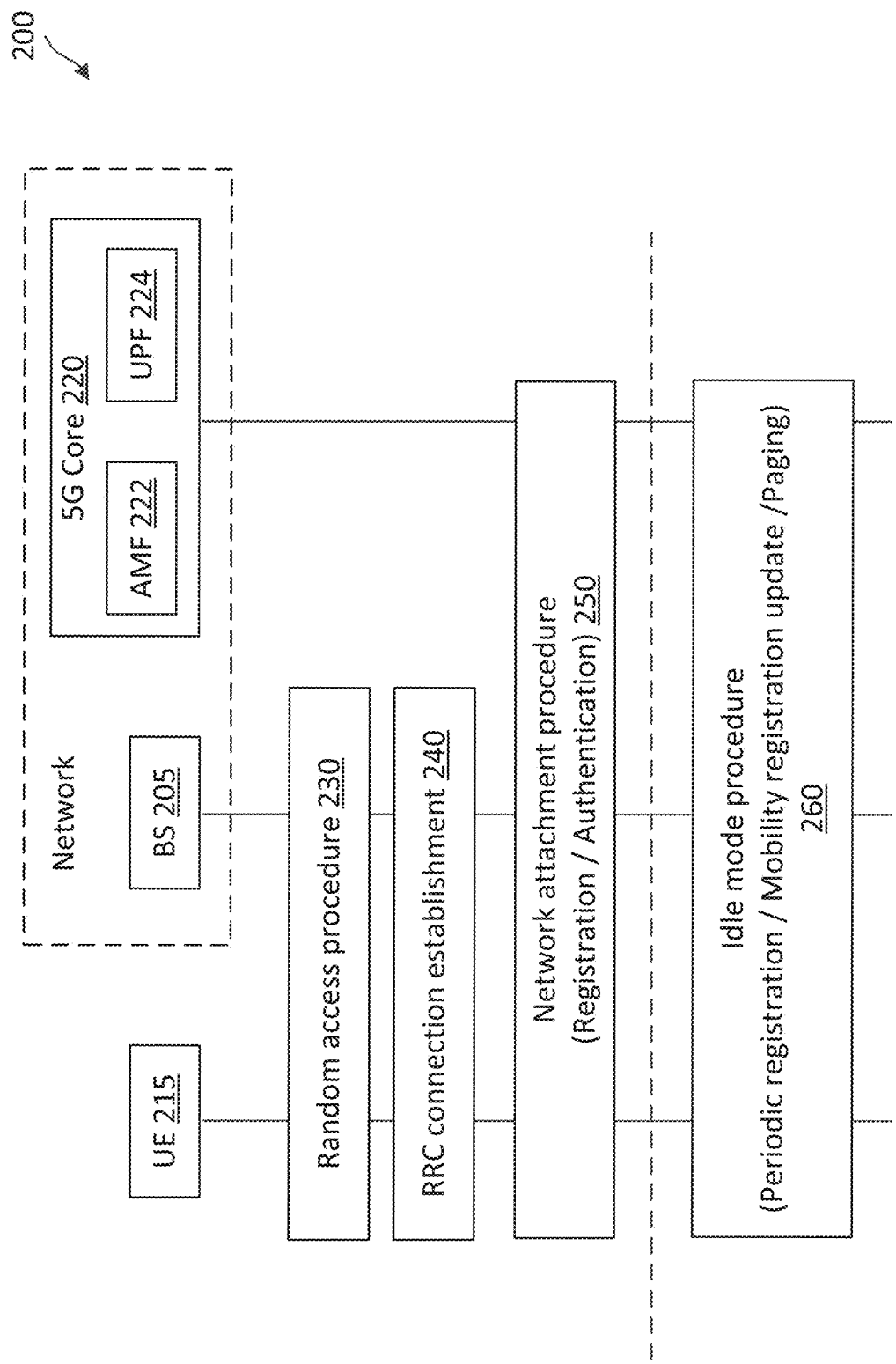
FIG. 2 is a signaling diagram illustrating a wireless network communication method according to some aspects of the present disclosure.

FIG. 2 a signaling diagram illustrating a wireless network communication method 200 according to some aspects of the present disclosure. The method 200 is employed by the network 100. In particular, the method 200 is implemented by a UE 215 and a network 202 including a BS 205 in communication with a 5G core network 220 for performing initial network access and idle mode operations. The network 202 may correspond to the network 100. The UE 215 may correspond to a UE 115 of the network 100. The BS 205 may correspond to a BS 105 of the network 100. In some instances, the BS 205 may be a 4G eNB. In some other instances, the BS 205 may be a 5G gNB. The 5G core network 220 may include an AMF 222 and a UPF 224. Steps of the method 200 can be executed by computing devices (e.g., a processor, processing circuit, and/or other suitable component) of the UE 215, the BS 205, a core network entity implementing the AMF 222 and/or UPF 224. As illustrated, the method 200 includes a number of enumerated steps, but embodiments of the method 200 may include additional steps before, after, and in between the enumerated steps. In some embodiments, one or more of the enumerated steps may be omitted or performed in a different order.

At step 230, the UE 215 performs a random access procedure with the BS 205. In this regard, the UE 215 may transmit a physical random access channel (PRACH) preamble (MSG1) to the BS 205, and the BS 205 may respond with a random access response (MSG2).

At step 240, the UE 215 performs a RRC connection establishment with the BS 205. In this regard, the UE 215 may transmit a RRC connection request to the BS 205, and the BS 205 may respond with a RRC connection setup response.

At step 250, after establishing a RRC connection with the BS 205, the UE 215 may initiate a network attachment/registration procedure with the network 202. The BS 105 may coordinate with the 5G core network 220 to identify the UE 215, authenticate the UE 215, and/or authorize the UE 215 for sending and/or receiving data in the network 100. In this regard, the AMF 222 may perform the authentication and/or the authorization for the UE 215 and the UPF 224 may set up bearers for transporting data to the BS 205 for the UE 215.

In some aspects, the UE 215 may be assigned with a subscription permanent identifier (SUPI). The UE 215 may use a public key of a home public land mobile network (PLMN) to encrypt the SUPI prior to transmission over-the-air. The UE 215 may perform a mutual authentication with the 5G core network 220 and establish a NAS security with the AMF 222, for example, using a NAS security mode command procedure. Upon a successful activation of the NAS security, the AMF 222 allocates a GUTI to the UE 215. The GUTI may include a PLMN ID and a serving-temporary mobile subscriber identify (S-TMSI). The UE 215 may subsequently identify itself using the GUTI (or the S-TMSI of the GUTI) when the UE 215 communicates with the AMF 222.

Additionally, the AMF 222 may assign the UE 215 with a tracking area (TA). Once the network attach procedure succeeds, a context is established for the UE 115 in the AMF 222. After a successful attach to the network 202, the UE 215 can move around the current TA. For tracking area update (TAU), the BS 205 may request the UE 215 to update the network 202 with the UE 215's location periodically. Alternatively, the UE 215 may only report the UE 215's location to the network 202 when entering a new TA. The TAU allows the network 202 to quickly locate the UE 215 and page the UE 215 upon receiving an incoming data packet or call for the UE 215. When the UE 215 has no active data communication with the BS 105 after the network attachment, the UE 215 may return to an idle mode (e.g., an RRC idle state).

At step 260, the UE 215 may perform various idle mode procedures. In some aspects, the UE 215 may be configured with a sleep-wake cycle. The UE 215 may power down certain frontend components, baseband components, and/r network layer processing component during a sleep period to save power. The UE 215 may wake up during a awake period to perform the idle mode procedure. Some examples of idle mode procedures may include cell measurements, cell monitoring, cell reselection, periodic registration, mobility registration update, and/or paging related operations. In some aspects, the UE 215 may perform a periodic registration with the network 202 to update a status of the UE 215 or notify the network 202 of the presence of the UE 215 at certain time intervals. Upon receiving a registration request message with a periodic registration type from the UE 215, the AMF 222 may perform a GUTI reallocation by generating a new GUTI for the UE 215 and notify the UE 215 of the new GUTI.

In some aspects, the UE 215 may perform a TAU procedure when the UE moves to a new TA. The UE may transmit a registration request message including a mobility registration update type. Upon receiving, a registration request message with a mobility registration update type from the UE 215, the AMF 222 may perform a GUTI reallocation by generating a new GUTI for the UE 215 and notify the UE 215 of the new GUTI.

In some aspects, the UE 215 may monitor a paging channel while in the idle mode. When the UPF 224 receives DL data for the UE 215 while the UE 215 is in the idle state, the UPF 224 may page the UE 215 via the paging channel. The UE 215 may respond to the network 202 by sending a service request. Upon receiving a service request from the UE 215, the AMF 222 may perform a GUTI reallocation by generating a new GUTI for the UE 215 and notify the UE 215 of the new GUTI. The new GUTI may be sent to the UE 215 before a current NAS signaling connection is released.

In some aspects, the UE 215 is a low-power device, for example, an IoT device. When the network 202 (e.g., at the UPF 224) receives DL data for the UE 215 while the UE 215 is in an idle mode, the network 202 may utilize a MT-EDT CP procedure or a MT-EDT UP procedure to reduce an awake time of the UE 215 to allow for power saving at the UE 215. For instance, the MT-EDT procedure may utilize a reduced the number of messages exchanges between the UE 215 and the network 202 compared to a conventional paging procedure so that the UE 215 may quickly return to a sleep mode. For instance, upon detecting a page from the network 202, the UE 215 may exchange MSG1, MSG2, MSG3, and MSG4 with the network BS 205 and the BS 205 may include DL data that triggered the paging in the MSG4. However, GUTI allocation is performed using a UCU procedure, which requires additional NAS message exchange, and thus may counteract the benefit of the ET MDT CP or UP procedure.

Accordingly, the present disclosure provides techniques for providing a UE (e.g., the UEs 115 and/or 215) with a new GUTI in a MT-EDT CP procedure or a MT-EDT UP procedure without utilizing a UCU procedure. For instance, a ET MDT CP procedure, a RRC early data complete message (MSG4) may include DL data associated with paging and the new GUTI. Alternatively, an additional RRC connection release message including the new GUTI may be added to the ET MDT CP procedure. In a MT-EDT UP procedure, a RRC connection release message (MSG4) can include DL data associated with paging and the new GUTI. Mechanisms for optimizing new GUTI reallocation for MT-EDT CP procedures and/or MT-EDT UP procedures are described in greater detail herein.

Figure 3:
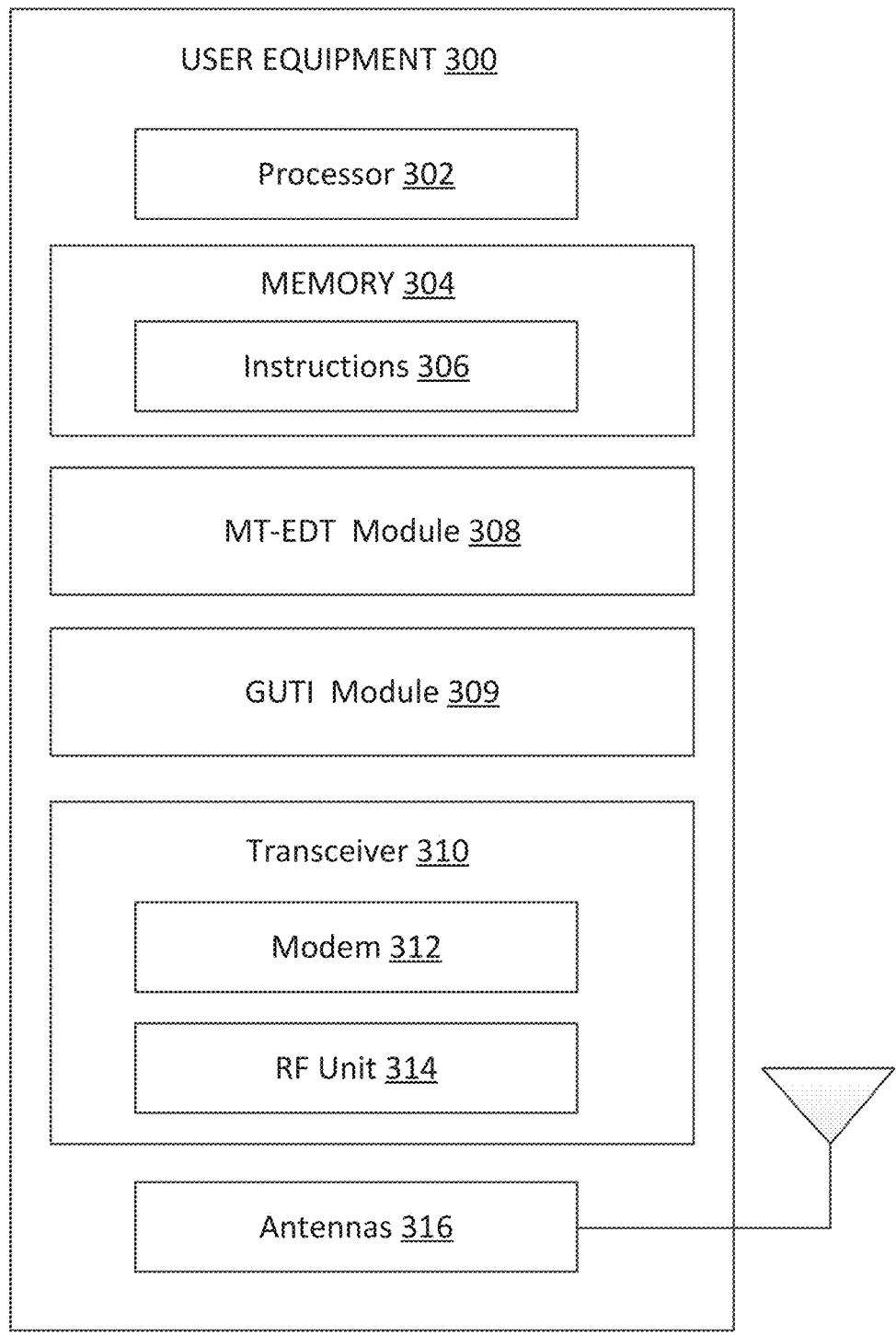
FIG. 3 is a block diagram of a user equipment (UE) according to some aspects of the present disclosure.

FIG. 3 is a block diagram of an exemplary UE 300 according to some aspects of the present disclosure. The UE 300 may be a UE 115 discussed above in FIG. 1. As shown, the UE 300 may include a processor 302, a memory 304, a MT-EDT module 308, a GUTI module 309, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 2 and 6-11. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the MT-EDT module 308 and the GUTI module 309 may be implemented via hardware, software, or combinations thereof. For example, each of the MT-EDT module 308 and the GUTI module 309 may be implemented as a processor, circuit, and/or instructions 306 stored in the memory 304 and executed by the processor 302. In some examples, the MT-EDT module 308 and/or the GUTI module 309 can be integrated within the modem subsystem 312. For example, the MT-EDT module 308 and/or the GUTI module 309 can be implemented by a combination of software components (e.g., executed by a DSP or a general processor) and hardware components (e.g., logic gates and circuitry) within the modem subsystem 312. In some examples, a UE may include the MT-EDT module 308 or the GUTI module 309. In other examples, a UE may include the MT-EDT module 308 and the GUTI module 309.

The MT-EDT module 308 may be used for various aspects of the present disclosure, for example, aspects of FIGS. 2 and 6-11. The MT-EDT module 308 is configured to monitor for paging from a network (e.g., the networks 100 and/or 202) during a RRC idle mode. For instance, the UE 300 may be configured with paging occasions (e.g., scheduled time-frequency resources) for monitoring of paging messages. Upon receiving a paging message with a MT-EDT-indication from the network, the MT-EDT module 308 is configured to perform a random access procedure with a serving BS (e.g., the BSs 105 and/or 205) for communication with the network, transmit a RRC early data request message with a CPSR to the BS, receive a RRC early data complete message from BS. In some instances, the RRC early data complete message may include a NAS service accept message carrying data associated with the paging and a new GUTI allocated to the UE 300. In some instances, the NAS service accept message may including a NAS ACK request and the MT-EDT module 308 is further configured to transmit a NAS ACK to the network to confirm the receipt of the NAS service accept message.

In some instances, the RRC early data complete message may include a NAS service accept message carrying data and a separate GUTI IE carrying new GUTI allocated to the UE 300. In some instances, the RRC early data complete message may include a NAS service accept message carrying data and the MT-EDT module 308 is further configured to receive a RRC connection release message including a GUTI IE carrying a new GUTI after receiving the RRC early data complete message.

In some aspects, the MT-EDT module 308 is configured to receive a paging message while still connected to the network, but with no active data transfer. Upon receiving a paging message, Upon receiving a paging message with a MT-EDT-indication from the network, the MT-EDT module 308 is configured to perform a random access procedure with a serving BS to resume communication with the network, transmit a RRC connection resume request message to the BS, receive a RRC connection release message from the BS. The RRC connection release message includes DL data associated with the paging and a GUTI IE carrying a new GUTI allocated to the UE 300.

The GUTI module 309 is configured to receive a GUTI from the network during an initial registration, a mobility registration update (e.g., during TAU), a periodic registration, and/or after transmitting a service request message to the network (e.g., triggered by a paging event), store a current GUTI in the memory 304, update the GUTI in the memory 304 upon receiving a new GUTI, retrieve the current GUTI from the memory 304 when communicating with an AMF (e.g., the AMF 222) of a core network (e.g., the core network 220). Mechanisms for receiving new GUTI during a paging event using optimized MT-EDT CP and/or MT-EDT UP procedures are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, the MT-EDT module 308, and/or the GUTI module 309 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data (e.g., PRACH preamble, RRC early data request message, RRC connection resume request message, NAS ACK) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., paging messages, UL data, DL data, random access response, RRC early data complete message, RRC connection release message) to the MT-EDT module 308 for processing. The antennas 316 may include multiple antennas of similar or different designs in order to sustain multiple transmission links. The RF unit 314 may configure the antennas 316.

In an example, the transceiver 310 is configured to receive a paging associated with a MT-EDT from a network, transmit a data request to the network in response to the paging, and receive, from the network, a message including a new GUTI, and at least one of data associated with the paging or a connection release, for example, by coordinating with the MT-EDT module 308.

In an aspect, the UE 300 can include multiple transceivers 310 implementing different RATs (e.g., NR and LTE). In an aspect, the UE 300 can include a single transceiver 310 implementing multiple RATs (e.g., NR and LTE). In an aspect, the transceiver 310 can include various components, where different combinations of components can implement different RATs.

Figure 4:
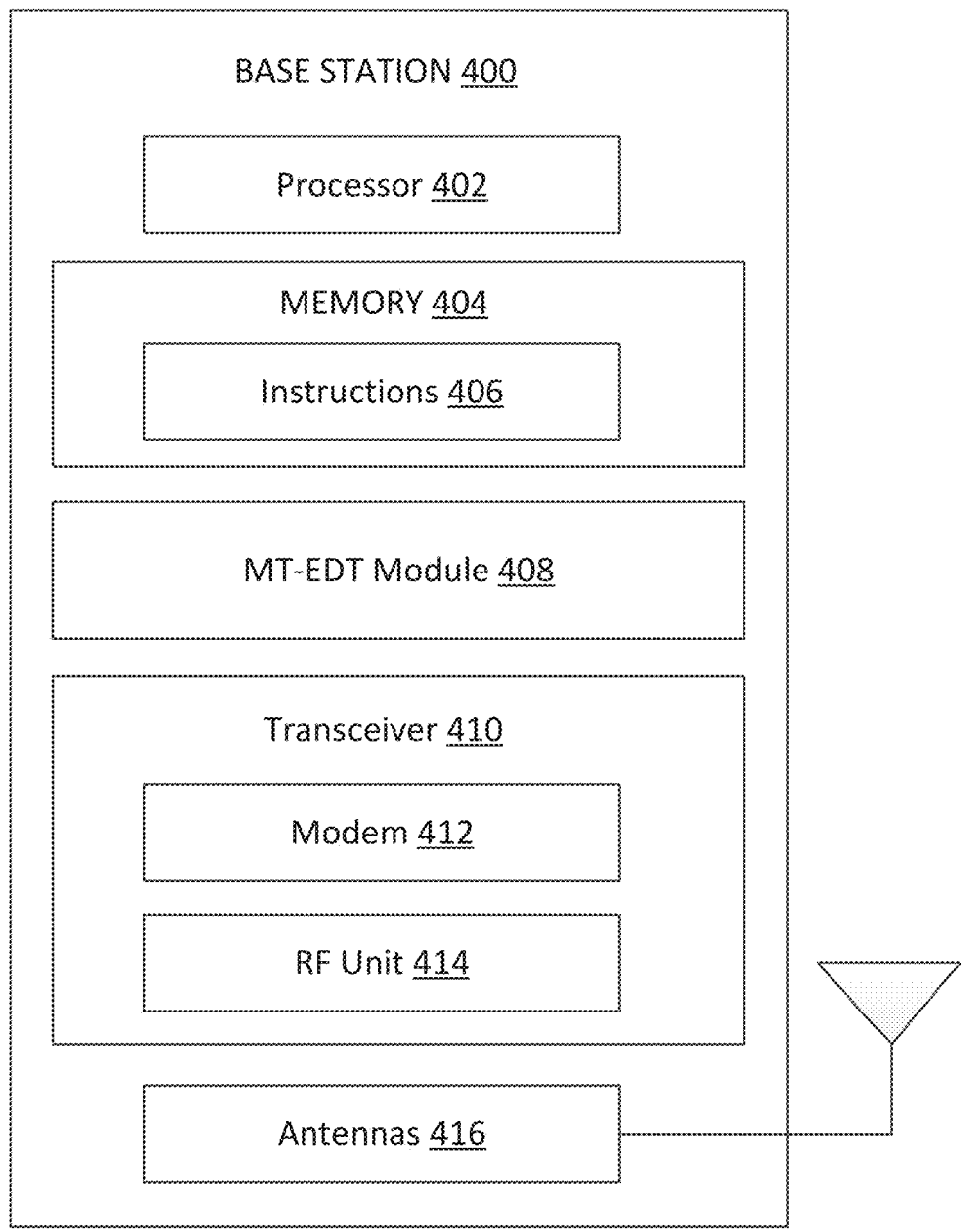
FIG. 4 is a block diagram of an exemplary base station (BS) according to some aspects of the present disclosure.

FIG. 4 is a block diagram of an exemplary BS 400 according to some aspects of the present disclosure. The BS 400 may be a BS 105 in the network 100 as discussed above in FIG. 1. As shown, the BS 400 may include a processor 402, a memory 404, a MT-EDT module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 2, 6-10, and 12. Instructions 406 may also be referred to as code, which may be interpreted broadly to include any type of computer-readable statement(s) as discussed above with respect to FIG. 3.

The MT-EDT module 408 may be implemented via hardware, software, or combinations thereof. For example, the MT-EDT module 408 may be implemented as a processor, circuit, and/or instructions 406 stored in the memory 404 and executed by the processor 402. In some instances, the MT-EDT module 408 can be integrated within the modem subsystem 412. For example, the MT-EDT module 408 can be implemented by a combination of software components (e.g., executed by a DSP or a general processor) and hardware components (e.g., logic gates and circuitry) within the modem subsystem 412.

The MT-EDT module 408 may be used for various aspects of the present disclosure, for example, aspects of FIGS. 2, 6-10, and 12. The MT-EDT module 408 is configured to facilitate MT-EDT CP and/or MT-EDT UP procedures during paging. For instance, the MT-EDT module 408 is configured to receive a DL data notification message associated with paging from a core network (e.g., an AMF 222 of the core network 220), transmit a paging message to a corresponding UE (e.g., the UEs 115, 215, and/or 300) served by the BS 400, receive a PRACH preamble from the UE, transmit a random access response to the UE, receive a RRC early date request message including a NAS CPSR from the UE, transmit an initial UE message including the NAS CPRS to the AMF, and receive a N2 DL NAS transport message from the AMF in response to the initial UE message.

In some instances, the N2 DL NAS transport message includes a release indication and a NAS service accept message including DL data associated with the paging and a new GUTI allocated to the UE and the MT-EDT module 408 is configured to forward the NAS service accept message to the UE in a RRC early data complete message and subsequently perform a S1 release or a N2 release with the AMF. In some instances, the NAS service accept message includes a NAS ACK request and the MT-EDT module 408 is configured to receive a NAS ACK message from the UE after transmitting the RRC early data complete message, forward the NAS ACK to the AMF, and subsequently perform a S1 release or a N2 release with the AMF. In some instances, the N2 DL NAS transport message includes a release indication, a separate GUTI IE carrying a new GUTI for the UE, and a NAS service accept message including DL data associated with the paging and the MT-EDT module 408 is configured to forward the GUTI IE and NAS service accept message including the data to the UE in a RRC early data complete message and subsequently perform a S1 release or a N2 release with the AMF. In some instances, the N2 DL NAS transport message includes DL data associated with the paging and the MT-EDT module 408 is further configured to receive, from the AMF, a UE context release message including a GUTI IE carrying a new GUTI for the UE, transmit a RRC early data complete message including the DL data to the UE, transmit a RRC connection release message including the GUTI IE to the UE, and subsequently perform a S1 release or a N2 release with the AMF.

In some instances, the MT-EDT module 408 is configured to receive a DL data notification message associated with paging from an AMF of a connected core network, transmit a paging message to a corresponding UE served by the BS 400 and connected to the network, receive a PRACH preamble from the UE, transmit a random access response to the UE, receive a RRC connection resume request from the UE, retrieve a UE context of the UE, transmit a UE context resume request message to the AMF based on the UE context, receive, from the AMF, a UE context response message including a GUTI IE carrying a new GUTI for the UE, receive DL data associated with the paging an UPF of the core network, transmit a RRC connection release message including the DL data and the GUTI IE to the UE, and subsequently perform a suspend procedure with the AMF.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., paging message, random access response, initial UE message, RRC early data complete message, RRC messages including a NAS ACK, UE context resume request message, and RRC connection release message) from the modem subsystem 412 (on outbound transmissions) or of transmissions originating from another source such as a UE 115 and/or UE 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to some aspects of the present disclosure. The antennas 416 may further receive data messages transmitted from other devices and provide the received data messages for processing and/or demodulation at the transceiver 410. The transceiver 410 may provide the demodulated and decoded data (e.g., DL data indication, PRACH preamble, RRC early data request message, RRC connection resume request message, N2 DL NAS transport message, UE context resume response message, UE context release message) to the MT-EDT module 408 for processing. The antennas 416 may include multiple antennas of similar or different designs in order to sustain multiple transmission links.

In an example, the transceiver 410 is configured to receive a data request associated with paging from a UE (e.g., the UEs 115, 215, and/or 300), transmit, to an AMF, a service request and/or a context resume request for the UE, receive, from the AMF, a message including a new GUTI for the UE and at least one of DL data associated with the paging or a release indication, for example, by coordinating with the MT-EDT module 408.

In an aspect, the BS 400 can include multiple transceivers 410 implementing different RATs (e.g., NR and LTE). In an aspect, the BS 400 can include a single transceiver 410 implementing multiple RATs (e.g., NR and LTE). In an aspect, the transceiver 410 can include various components, where different combinations of components can implement different RATs.

Figure 5:
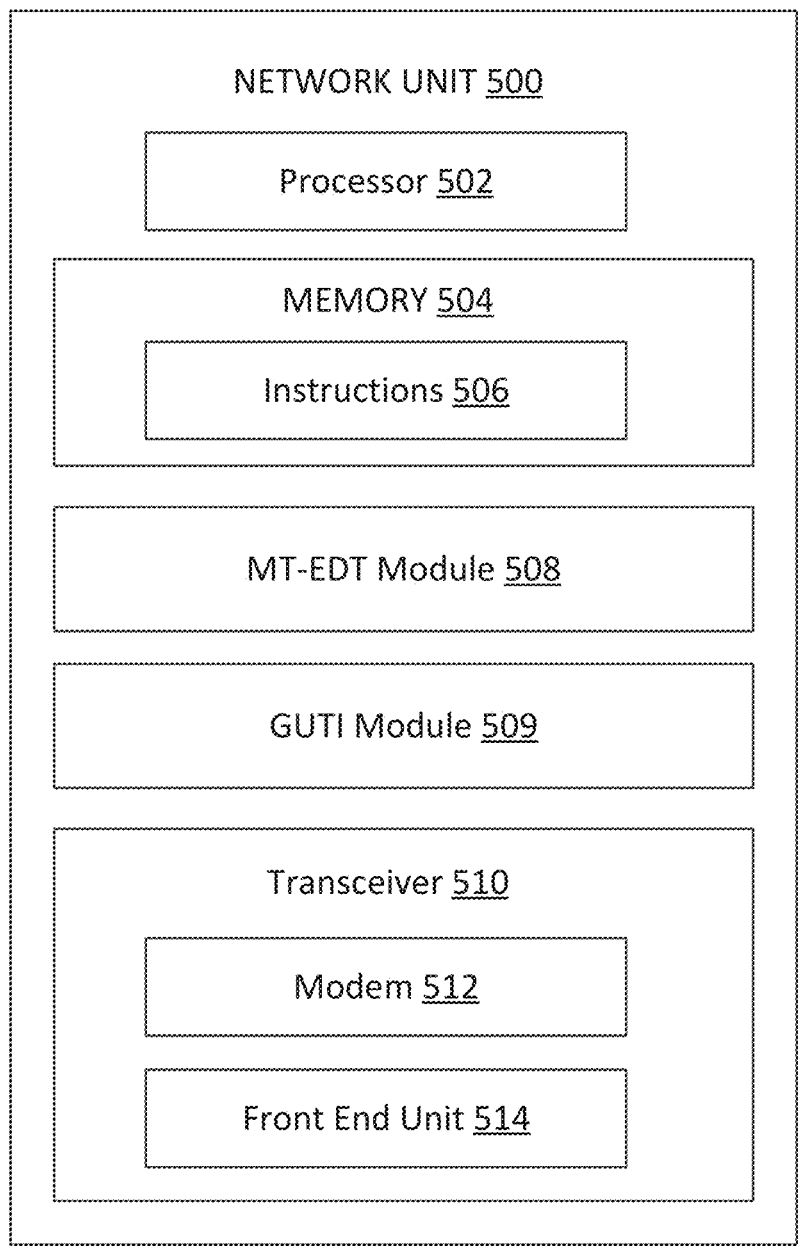
FIG. 5 is a block diagram of an exemplary network unit according to some aspects of the present disclosure.

FIG. 5 is a block diagram of an exemplary network unit 500 according to some aspects of the present disclosure. The network unit 500 may be a core network component of a core network such as the core network 220 discussed above in FIG. 2. A shown, the network unit 500 may include a processor 502, a memory 504, a MT-EDT module 508, a GUTI module 509, and a transceiver 510 including a modem subsystem 512 and a frontend unit 514. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2, 6-10, and 13. Instructions 506 may also be referred to as code, which may be interpreted broadly to include any type of computer-readable statement(s) as discussed above with respect to FIG. 3.

Each of the MT-EDT module 508 and the GUTI module 509 may be implemented via hardware, software, or combinations thereof. For example, each of the MT-EDT module 508 and the GUTI module 509 may be implemented as a processor, circuit, and/or instructions 506 stored in the memory 504 and executed by the processor 502. In some examples, the MT-EDT module 508 and/or the GUTI module 509 can be integrated within the modem subsystem 512. For example, the MT-EDT module 508 and/or the GUTI module 509 can be implemented by a combination of software components (e.g., executed by a DSP or a general processor) and hardware components (e.g., logic gates and circuitry) within the modem subsystem 512. In some examples, a UE may include the MT-EDT module 508 or the GUTI module 509. In other examples, a UE may include the MT-EDT module 508 and the GUTI module 509.

The MT-EDT module 508 may be used for various aspects of the present disclosure, for example, aspects of FIGS. 2, 6-10, and 13. In some aspects, the network unit 500 implements functions of a UPF (e.g., the UPF 224). The MT-EDT module 508 is configured to receive DL data from an external network for a UE registered to a network and page the UE by transmitting a DL data indication including the data to an AMF (e.g., the AMF 222) serving the UE for MT-EDT CP. Alternatively, for MT-EDT UP, the MT-EDT module 508 is configured to receive DL data from an external network for a UE registered to a network, page the UE by transmitting a DL data indication, to a corresponding AMF, and forward data to a serving BS (e.g., the BSs 105, 205, and/or 400) of the paged UE.

In some aspects, the network unit 500 implements functions of an AMF. For MT-EDT CP, the MT-EDT module 508 is configured to receive, from a UPF, a DL data notification including DL data and a MT-EDT indication for a UE, transmit a paging message to a BS serving the UE, receive an initial UE message including a NAS CPSR from the BS, and transmit a N2 DL NAS transport message including the DL data, a new GUTI for the UE, and a release indication. In some instances, the N2 DL NAS transport message includes a release indication and a NAS service accept message carrying data and the new GUTI. In some instances, the NAS service accept message may additionally include a NAS ACK request and the MT-EDT module is configured to receive a NAS ACK from the UE confirming the receipt of the NAS service accept message with the new GUTI. In some instances, the N2 DL NAS transport message includes a NAS service accept message carrying the DL data, a separate GUIT IE carrying the new GUTI, and a release indication. In some instances, the N2 DL NAS transport message including the DL data and the MT-EDT module is configured to transmit a UE context release message including the new GUTI to the serving BS.

For MT-EDT UP, the MT-EDT module 508 is configured to receive, from a UPF, a DL data notification including a MT-EDT indication and DL data for a UE, transmit a paging message to a BS serving the UE, receive, from the BS, a UE context resume request message from the BS, transmit, to the BS, a UE context resume release message including a GUTI IE carrying a new GUTI for the UE.

The GUTI module 509 is configured to allocate GUTI for UEs during initial registration, mobility update registration, periodic registration, and/or after receiving a NAS service request message from a UE during a paging event. The GUTI module 509 may perform the GUTI allocation or reallocation from a pool of available values and may use various mechanisms or algorithms to generate a new value for a new GUTI. Mechanisms for GUTI reallocation for MT-EDT CP and/or MT-EDT UP optimization are described in greater detail herein.

As shown, the transceiver 510 may include the modem subsystem 512 and the frontend unit 514. The transceiver 510 can be configured to communicate bi-directionally with other devices, such as the BSs 105, 205, and 400 and/or another core network element. The modem subsystem 512 may be configured to modulate and/or encode data according to a MCS, e.g., a LDPC coding scheme, a turbo coding scheme, a convolutional coding scheme, etc. The frontend unit 514 may include electrical-to-optical (E/O) components and/or optical-to-electrical (O/E) components that convert an electrical signal to an optical signal for transmission to a BS such as the BSs 105, 205, and 500 and/or receive an optical signal from the BS and convert the optical signal into an electrical signal, respectively. The frontend unit 514 may be configured to process (e.g., perform analog to digital conversion or digital to analog conversion, optical to electrical conversion or electrical to optical conversion, etc.) modulated/encoded data from the modem subsystem 512 (on outbound transmissions) or of transmissions originating from another source such as a backend or core network. Although shown as integrated together in transceiver 510, the modem subsystem 512 and the frontend unit 514 may be separate devices that are coupled together at the network unit 500 to enable the network unit 500 to communicate with other devices. The frontend unit 514 may transmit optical signal carrying the modulated and/or processed data over an optical link (e.g., backhaul link). The frontend unit 514 may further receive optical signals carrying data messages and provide the received data messages for processing and/or demodulation at the transceiver 510.

In an example, the transceiver 510 is configured to transmit a paging message for a UE associated with a first GUTI, receive a service request or a context resume request for the UE, and transmit a message including a second GUTI different from the first GUTI and at least one of data associate associated with the paging or a connection release, for example, by coordinating with the MT-EDT module 508 and the GUTI module 509.

Figure 6:
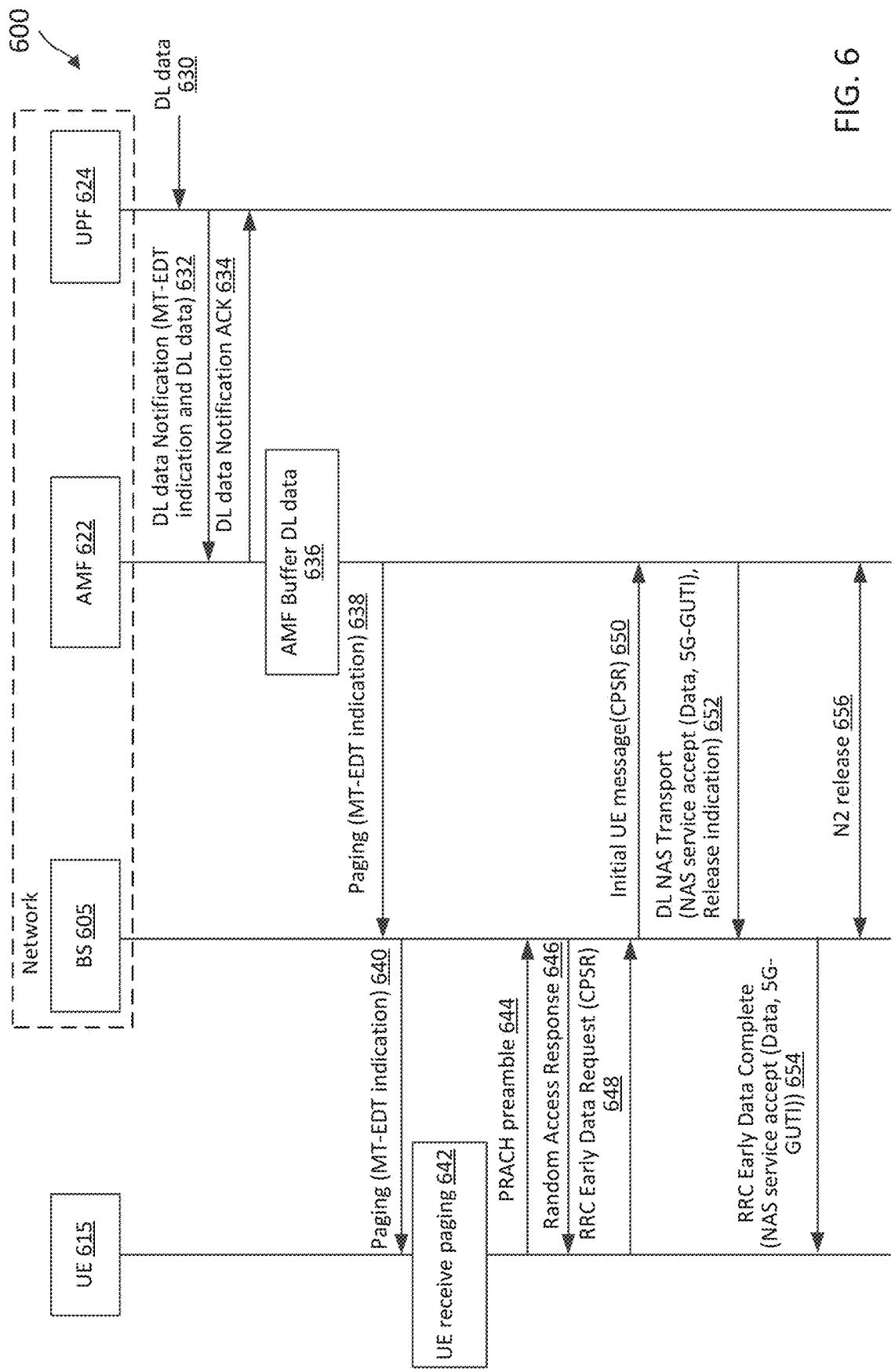
FIG. 6 is a signaling diagram illustrating a globally unique temporary identity (GUTI) reallocation method for mobile-terminated (MT) early data transmission (EDT) control plane CP optimization according to some aspects of the present disclosure.

FIG. 6 is a signaling diagram illustrating a GUTI reallocation method 600 for MT-EDT CP optimization according to some aspects of the present disclosure. The method 600 is implemented by a UE 615, a BS 605, an AMF 622, and a UPF 624. The UE 615 may be similar to the UEs 115, 215 and/or 300. In some instances, the UE 615 is a low-power device, such as an IoT device. The BS 605 may be similar to the BSs 105, 205, and/or 400. The AMF 622 may be similar to the AMF 222. The UPF 624 may be similar to the UPF 224. The AMF 622 and the UPF 624 may correspond to portion of a 5G core network (e.g., the network 220). In some instances, the BS 605 may be a 4G eNB serving the UE 615. In some other instances, the BS 605 may be a 5G gNB serving the UE 615. The BS 605, the AMF 622, and the UPF 624 may be generally referred to as a network, core network components, or network-side. Steps of the method 600 can be executed by computing devices (e.g., a processor, processing circuit, and/or other suitable component) of the UE 615, the BS 605, a core network such as the network unit 500 device implementing the AMF 622 and/or UPF 624. As illustrated, the method 600 includes a number of enumerated steps, but embodiments of the method 600 may include additional steps before, after, and in between the enumerated steps. In some embodiments, one or more of the enumerated steps may be omitted or performed in a different order.

The method 600 may be implemented after the UE 615 has completed an initial network attachment or registration procedure with the network and received a GUTI (e.g., consisting of a PLMN ID and a S-TSMI) from the AMF 622, for example, as discussed above in the method 200 with respect to FIG. 2. The GUTI may be referred to as a 5G-GUTI. The method 600 may be performed while the UE 615 is in an idle state. For instance, the method 600 may be implemented as part of the idle mode procedure during the step 260 of the method 200. The method 600 forwards data associated with paging over a control plane, for example, from the AMF 622 to the service BS 605.

At step 630, the UPF 624 receives DL data for the UE 615, for example, from an external network (e.g., an Internet protocol (IP) network or a non-IP network such as a local area network (LAN)). For instance, the UE 615 may be in a sleep mode during this time.

At step 632, the UPF 224 transmits a DL data notification message to the AMF 622. The DL data notification message includes a MT-EDT indication for the UE 615 and the DL data.

At step 634, in response to the DL data notification message, the AMF 622 transmit a DL data notification ACK message to the UPF 624.

At step 636, the AMF 622 buffers the DL data for the UE 615.

At step 638, the AMF 622 transmits a paging message to the BS 605 serving the UE 615. The paging message includes the MT-EDT indication. The BS 605 may have configured the UE 615 with paging occasions and may transmit the paging message to the UE 615 during a paging occasion of the UE 615.

At step 640, upon receiving the paging message from the AMF 622, the BS 605 transmits a paging message to the UE 615. The paging message includes the MT-EDT indication. For instance, the UE 615 may cycle through a sleep-awake cycle during the idle state and may wake up during paging occasions (configured by the BS 605) to monitor for paging message from the network.

At step 642, the UE 615 receives the paging message. Upon receiving the paging message, the UE 615 performs a RACH procedure with the BS 605 to establish a RRC connection for receiving data associated with the paging. At step 644, the UE 615 transmits a PRACH preamble (MSG1) to the BS 605. At step 646, upon detecting the PRACH preamble, the BS 605 transmits a random access response (MSG2) to the UE 615. The random access response may include a scheduled resource for the UE 615. At step 648, the UE 615 transmits a RRC early data request message (MSG3) to the BS 605. The RRC early data request message includes a NAS CPSR message. The RRC early data request message may include the S-TMSI from the GUTI received earlier. Alternatively, the CPSR may include the S-TMSI from the GUTI received earlier.

At step 650, upon receiving the RRC early data request message, the BS 605 transmits an initial UE message to the AMF 622. The BS 605 forwards the CPSR to the AMF 622 by including the CPSR in the initial UE message. The BS 605 may determine which AMF for forwarding the CPSR based on the S-TMSI in the RRC early data request message.

At step 652, in response to the initial UE message, the AMF 622 transmits a N2 DL NAS transport message to the BS 605. The N2 DL NAS transport message includes a NAS service accept message and a release indication. The AMF 622 may identify the UE 615 based on the S-TMSI in the initial UE message. Alternatively, the AMF 622 may identify the UE 615 based on the S-TMSI in the CPSR. The AMF 622 generates or reallocate a new 5G-GUTI for the UE 615. The NAS service accept message includes the DL data and the new 5G-GUTI. The NAS service accept message may be represented by NAS service accept (DL data, 5G-GUTI). The release indication instructs the BS 605 to release the RRC connection with the UE 615 after transmitting NAS service accept message to the UE 615. In some instance, the N2 DL NAS transport message may also include a packet data unit (PDU) session identifier (ID) associated with the data. For instance, the UE 615 may have established a certain PDU session prior to entering the idle mode and the data associated with the PDU session may arrive while the UE 615 is in the idle mode.

At step 654, upon receiving the N2 DL NAS transport message, the BS 605 transmits a RRC early data complete message to the UE 615 to respond to the RRC early data request message. The BS 605 forwards the NAS service accept message to the UE 615 by including the NAS service accept message (including the DL data and the 5G-GUTI) in the RRC early data complete message.

At step 656, after receiving the N2 DL NAS transport message including the 5G-GUTI, the BS 605 performs an N2 release with the AMF 622 via N2 signaling. N2 refers to the interface between a 5G core network and a 5G gNB or between a 5G core network and a 4G eNB. At this time, the UE 615 has completed receiving the DL data associated with the paging and return to a sleep mode to save power.

As discussed above, a newly allocated GUTI is typically sent in a UCU procedure. For instance, the AMF 622 may send a UCU update command including a new GUTI to a UE (e.g., the UE 615), and the UE may respond by sending a UCU complete message to the AMF 622. If the AMF 622 utilizes the UCU update procedure for updating the UE 615 with the new 5G-GUTI, the BS 605 is required to transmit an additional RRC connection release message to the UE 615 after the UCU procedure. Thus, there will be at least three additional messages exchanged between the UE 615 and the BS 605 after the last RRC early data complete message. The method 600 optimizes the GUTI reallocation procedure by enabling the AMF 622 to send a single NAS message including the DL data and the 5G-GUTI and enabling the BS 605 to include the 5G-GUTI in the RRC early data complete message for MT-EDT instead of utilizing the UCU procedure.

In some aspects, the AMF 622 may forward the DL data to the BS 605 in multiple NAS DL transport messages and may include a release indication and a NAS message including the 5G-GUTI in the last N2 DL NAS transport message. The BS 605 may forward the DL data to the UE 615. Thus, upon receiving a NAS DL transport message including the NAS message including the 5G-GUTI, the BS 605 may transmit, to the UE 615, a RRC connection release message including the 5G-GUTI.

Figure 7:
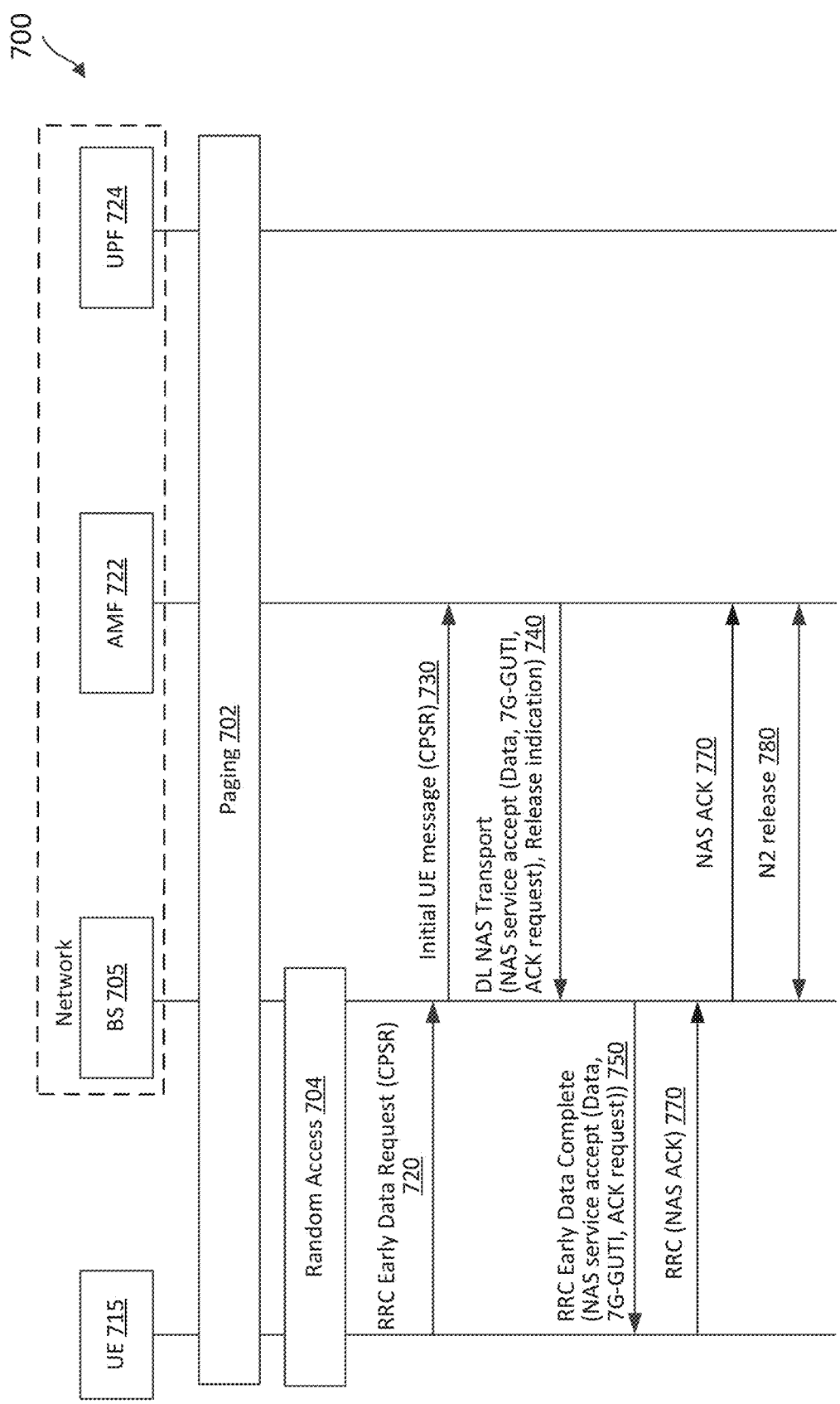
FIG. 7 is a signaling diagram illustrating a GUTI reallocation method for MT-EDT CP optimization according to some aspects of the present disclosure.

FIG. 7 is a signaling diagram illustrating a GUTI reallocation method 700 for MT-EDT CP optimization according to some aspects of the present disclosure. The method 700 is implemented by a UE 715, a BS 705, an AMF 722, and a UPF 724. The UE 715 may be similar to the UEs 115, 215, 300, and/or 615. In some instances, the UE 715 is a low-power device, such as an IoT device. The BS 705 may be similar to the BSs 105, 205, 400, and/or 605. The AMF 722 may be similar to the AMFs 222 and/or 622. The UPF 724 may be similar to the UPFs 224 and/or 624. The AMF 722 and the UPF 724 may correspond to portion of a 5G core network (e.g., the network 220). In some instances, the BS 705 may be a 4G eNB serving the UE 715. In some other instances, the BS 705 may be a 5G gNB serving the UE 715. Steps of the method 700 can be executed by computing devices (e.g., a processor, processing circuit, and/or other suitable component) of the UE 715, the BS 705, a core network such as the network unit 500 device implementing the AMF 722 and/or UPF 724. As illustrated, the method 700 includes a number of enumerated steps, but embodiments of the method 700 may include additional steps before, after, and in between the enumerated steps. In some embodiments, one or more of the enumerated steps may be omitted or performed in a different order.

Generally speaking, the method 700 includes features similar to method 600 in many respects. For example, at step 702, the network pages the UE 715 upon arrival of DL data for the UE 715. The paging may include steps similar to the steps 632, 634, 636, 638, and 640. At step 704, in response to the paging, the UE 715 performs a random access with the BS 705 by performing steps similar to the steps 642 and 646. At step 720, the UE 715 transmits a RRC early data request to the BS 705 similar to the step 648. At step 730, the BS 705 transmits an initial UE message to the AMF 722 similar to the step 650. Accordingly, for sake of brevity, details of the steps 702, 704, 720, and 730 will not be repeated here. Please refer to the corresponding descriptions above.

At step 740, in response to the initial UE message, the AMF 722 transmits a N2 DL NAS transport message including the DL data, a new 5G-GUTI, and a release indication to the BS 705 similar to the step 654. The AMF 722 generates the 5G-GUTI in response to the CPSR. However, the NAS service accept message additionally includes an ACK request. The NAS service accept message may be represented by NAS service accept (DL data, 5G-GUTI, ACK request).

At step 750, upon receiving the N2 DL NAS transport message, the BS 705 transmits a RRC early data complete message to the UE 715. The BS 705 forwards the NAS service accept message to the UE 715 by including the NAS service accept message (including the DL data, the new 5G-GUTI, and the ACK request) in the RRC early data complete message.

At step 760, in response to the NAS ACK, the UE 715 transmits a NAS ACK message to the network to confirm the receipt of the new 5G-GUTI. At step 770, the BS 705 forwards the NAC ACK to the AMF 722.

At step 780, the BS 705 performs an N2 release with the AMF 722. At this time, the UE 715 has completed receiving the DL data associated with the paging and return to a sleep mode to save power.

The reception of the NAS ACK at the AMF 722 ensures that the UE 715 and the AMF 722 are using the same GUTI for the UE 715. In some aspects, instead of the utilizing the NAS ACK for confirming the receipt of the new GUTI, N2 signaling may be used for the confirmation. For instance, the AMF 722 may transmit a N2 delivery confirmation request and the BS 605 may transmit a N2 delivery ACK or negative-ACK (NACK) to the AMF 722. In some aspects, when there is no confirmation for the new GUTI, the AMF 722 may keep both the old GUTI and the new GUTI for the UE 715. The AMF 722 may use the new GUTI for a subsequent communication with the UE 715. If the communication fails, the AMF 722 may fall back to use the old GUTI.

Figure 8:
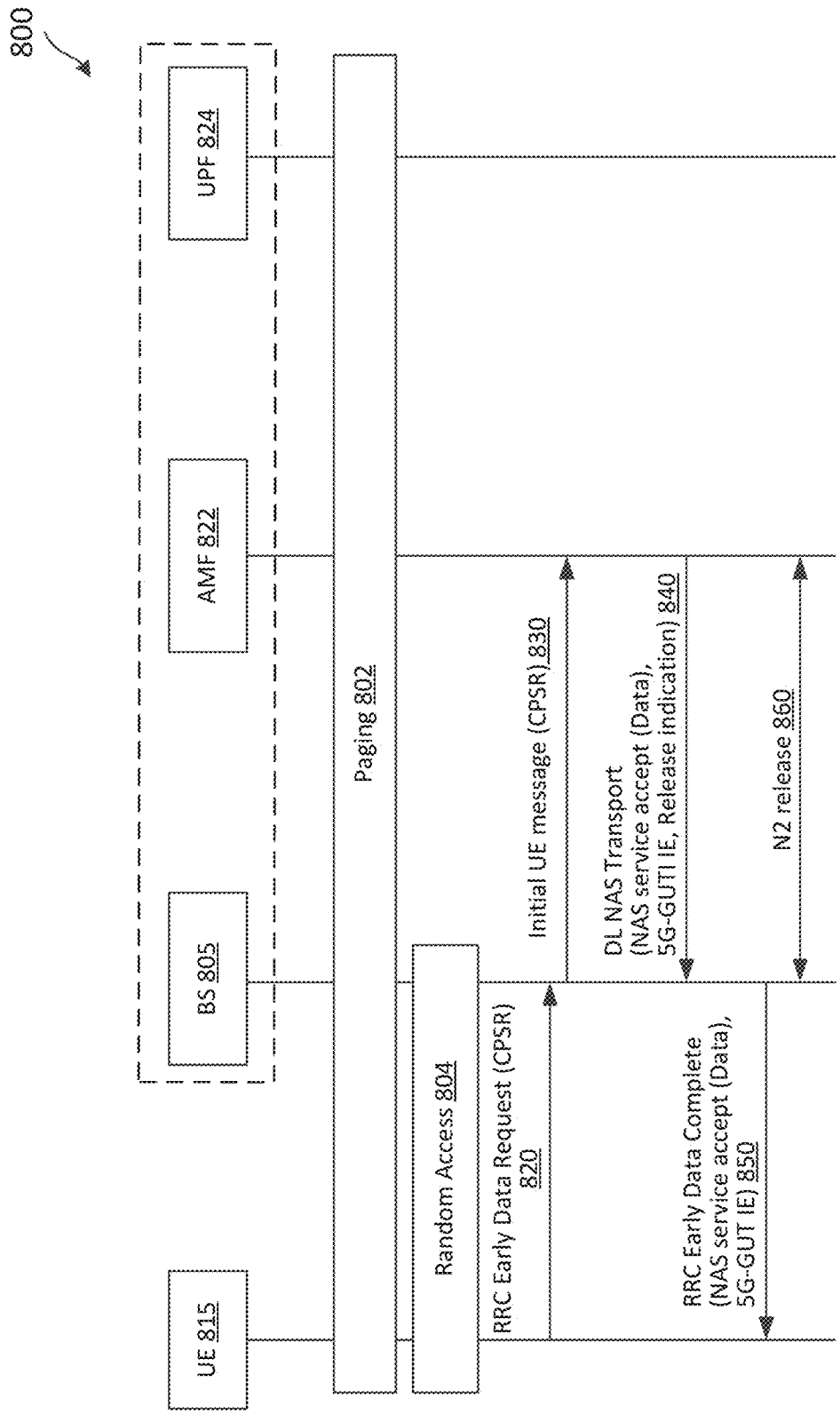
FIG. 8 is a signaling diagram illustrating a GUTI reallocation method for MT-EDT CP optimization according to some aspects of the present disclosure.

FIG. 8 is a signaling diagram illustrating a GUTI reallocation method 800 for MT-EDT CP optimization according to some aspects of the present disclosure. The method 800 is implemented by a UE 815, a BS 805, an AMF 822, and a UPF 824. The UE 815 may be similar to the UEs 115, 215, 300, 615, and/or 715. In some instances, the UE 815 is a low-power device, such as an IoT device. The BS 805 may be similar to the BSs 105, 205, 400, 605, and/or 705. The AMF 822 may be similar to the AMFs 222, 622, and/or 722. The UPF 824 may be similar to the UPFs 224, 624, and/or 724. The AMF 822 and the UPF 824 may correspond to portion of a 5G core network (e.g., the network 220). In some instances, the BS 805 may be a 4G eNB serving the UE 815. In some other instances, the BS 805 may be a 5G gNB serving the UE 815. Steps of the method 800 can be executed by computing devices (e.g., a processor, processing circuit, and/or other suitable component) of the UE 815, the BS 805, a core network such as the network unit 500 device implementing the AMF 822 and/or UPF 824. As illustrated, the method 800 includes a number of enumerated steps, but embodiments of the method 800 may include additional steps before, after, and in between the enumerated steps. In some embodiments, one or more of the enumerated steps may be omitted or performed in a different order.

Generally speaking, the method 800 includes features similar to method 600 in many respects. For example, at step 802, the network pages the UE 815 upon arrival of DL data for the UE 815. The paging may include steps similar to the steps 632, 634, 636, 638, and 640. At step 804, in response to the paging, the UE 815 performs a random access with the BS 805 by performing steps similar to the steps 642 and 646. At step 820, the UE 815 transmits a RRC early data request to the BS 805 similar to the step 648. At step 830, the BS 805 transmits an initial UE message to the AMF 822 similar to the step 650. Accordingly, for sake of brevity, details of the steps 802, 804, 820, and 830 will not be repeated here. Please refer to the corresponding descriptions above.

At step 840, in response to the initial UE message, the AMF 822 transmits a N2 DL NAS transport message including the DL data, a new 5G-GUTI, and a release indication to the BS 805 similar to the step 654. However, the 5G-GUTI is transmitted as a separate message from the NAS service accept message. The 5G-GUTI is transmitted as a 5G-GUTI IE. In other words, the N2 DL NAS transport message includes a NAS service accept message including the DL data, a 5G-GUTI IE including a new 5G-GUTI allocated to the UE 815, and a release indication.

At step 850, upon receiving the N2 DL NAS transport message, the BS 805 transmits a RRC early data complete message to the UE 815. The BS 805 forwards the NAS service accept message to the UE 815 by including the NAS service accept message (including the DL data) and the 5G-GUTI IE in the RRC early data complete message.

At step 860, after receiving the N2 DL NAS transport message including the 5G-GUTI, the BS 805 performs an N2 release with the AMF 822. At this time, the UE 815 has completed receiving the DL data associated with the paging and return to a sleep mode to save power.

In some aspects, the method 800 can include the NAS ACK mechanisms described in the method 700, for example, by including a NAS ACK request in the NAS service accept message at the step 840. Alternatively, the method 800 can include an ACK request in the N2 DL NAS transport message as a separate message or a parameter from the NAS service accept message at step 840 and the BS 805 may include the ACK request in the RRC early data complete message.

Figure 9:
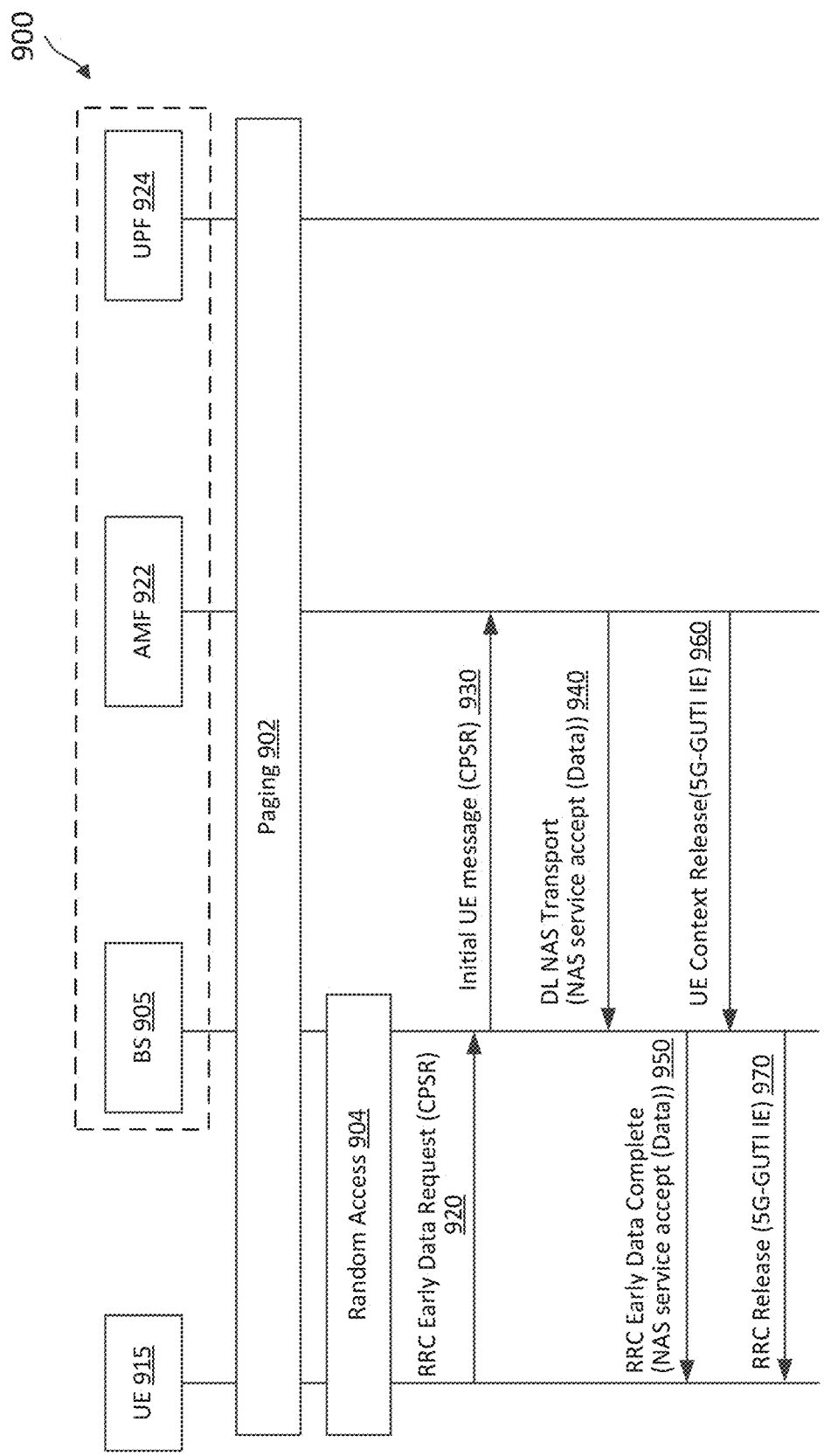
FIG. 9 is a signaling diagram illustrating a GUTI reallocation method for MT-EDT CP optimization according to some aspects of the present disclosure.

FIG. 9 is a signaling diagram illustrating a GUTI reallocation method 900 for MT-EDT CP optimization according to some aspects of the present disclosure. The method 900 is implemented by a UE 915, a BS 905, an AMF 922, and a UPF 924. The UE 915 may be similar to the UEs 115, 215, 300, 615, 715, and/or 815. In some instances, the UE 915 is a low-power device, such as an IoT device. The BS 905 may be similar to the BSs 105, 205, 400, 605, 705, and/or 805. The AMF 922 may be similar to the AMFs 222, 622, 722, and/or 822. The UPF 924 may be similar to the UPFs 224, 624, 724, and/or 824. The AMF 922 and the UPF 924 may correspond to portion of a 5G core network (e.g., the network 220). In some instances, the BS 905 may be a 4G eNB serving the UE 915. In some other instances, the BS 905 may be a 5G gNB serving the UE 915. Steps of the method 900 can be executed by computing devices (e.g., a processor, processing circuit, and/or other suitable component) of the UE 915, the BS 905, a core network such as the network unit 500 device implementing the AMF 922 and/or UPF 924. As illustrated, the method 900 includes a number of enumerated steps, but embodiments of the method 900 may include additional steps before, after, and in between the enumerated steps. In some embodiments, one or more of the enumerated steps may be omitted or performed in a different order.

Generally speaking, the method 900 includes features similar to method 600 in many respects. For example, at step 902, the network pages the UE 915 upon arrival of DL data for the UE 915. The paging may include steps similar to the steps 632, 634, 636, 638, and 640. At step 904, in response to the paging, the UE 915 performs a random access with the BS 905 by performing steps similar to the steps 642 and 646. At step 920, the UE 915 transmits a RRC early data request to the BS 905 similar to the step 648. At step 930, the BS 905 transmits an initial UE message to the AMF 922 similar to the step 650. Accordingly, for sake of brevity, details of the steps 902, 904, 920, and 930 will not be repeated here. Please refer to the corresponding descriptions above.

At step 940, in response to the initial UE message, the AMF 922 transmits a N2 DL NAS transport message including the DL data.

At step 950, upon receiving the N2 DL NAS transport message, the BS 905 transmits a RRC early data complete message to the UE 915. The BS 905 forwards the NAS service accept message to the UE 915 by including the NAS service accept message (including the DL data) in the RRC early data complete message.

At step 960, the AMF 922 transmits a UE context release message including a new 5G-GUTI IE to the BS 905 and instruct the BS 905 to transmit a RRC connection release to the UE 915.

At step 970, the BS 905 transmits a RRC connection release message including the 5G-GUTI IE to the UE 915.

In some aspects, when employing the methods 800 or 900, the 5G-GUTI IE can be sent as a ciphered transparent container in the RRC (connection release or early data complete) message. In this regard, the RRC layer at the UE 815 or 915 may forward the container to the NAS layer. The NAS deciphers the container to receive the new 5G-GUTI. The container may be in the form of a type-length-value (TLV) message or value (V) only message. A message authentication code for NAS integrity (NAS-MAC) can be additionally included in the transparent container. If a NAS-MAC is present, the UE may verify the integrity protection of the container by verifying against the received NAS-MAC.

Figure 10:
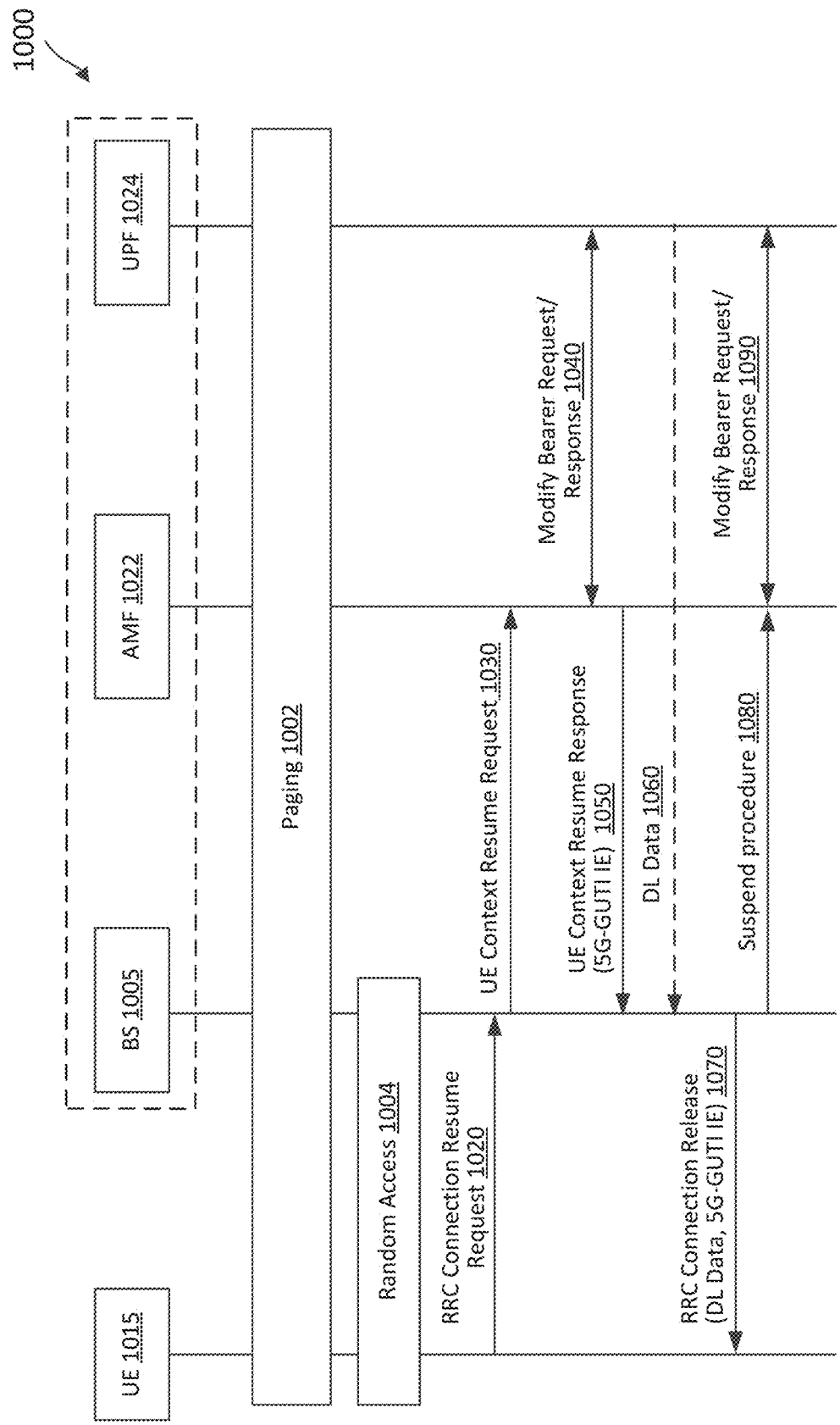
FIG. 10 is a signaling diagram illustrating a GUTI reallocation method for MT-EDT user plane (UP) optimization according to some aspects of the present disclosure.

FIG. 10 is a signaling diagram illustrating a GUTI reallocation method 1000 for MT-EDT UP optimization according to some aspects of the present disclosure. The method 1000 is implemented by a UE 1015, a BS 1005, an AMF 1022, and a UPF 1024. The UE 1015 may be similar to the UEs 115, 215, 300, 615, 715, 815, and/or 915. In some instances, the UE 1015 is a low-power device, such as an IoT device. The BS 1005 may be similar to the BSs 105, 205, 400, 605, 705, 805, and/or 905. The AMF 1022 may be similar to the AMFs 222, 622, 722, 822, and/or 922. The UPF 1024 may be similar to the UPFs 224, 624, 724, 824, and/or 924. The AMF 1022 and the UPF 1024 may correspond to portion of a 5G core network (e.g., the network 220). In some instances, the BS 1005 may be a 4G eNB serving the UE 1015. In some other instances, the BS 1005 may be a 5G gNB serving the UE 1015. Steps of the method 1000 can be executed by computing devices (e.g., a processor, processing circuit, and/or other suitable component) of the UE 1015, the BS 1005, a core network such as the network unit 500 device implementing the AMF 1022 and/or UPF 1024. As illustrated, the method 1000 includes a number of enumerated steps, but embodiments of the method 1000 may include additional steps before, after, and in between the enumerated steps. In some embodiments, one or more of the enumerated steps may be omitted or performed in a different order. The method 1000 may be implemented after the UE 615 has completed an initial network attachment procedure with the network and received a GUTI (e.g., including a PLMN ID and a S-TMSI) from the AMF 622, for example, as discussed above in the method 200 with respect to FIG. 2.

Generally speaking, the method 1000 includes features similar to method 600 in many respects. For example, at step 1002, the network pages the UE 1015 upon arrival of DL data for the UE 1015. The paging may include steps similar to the steps 632, 634, 636, 638, and 640. At step 1004, in response to the paging, the UE 1015 performs a random access with the BS 1005 by performing steps similar to the steps 642 and 646. Accordingly, for sake of brevity, details of the steps 1002 and 1004 will not be repeated here. Please refer to the corresponding descriptions above.

However, the method 1000 may be performed while the UE 1015 is in a RRC connected mode, but during a suspend state. During the RRC connected mode, the BS 1005 may have a UE context of the UE 1015. Additionally, the method 1000 forwards data associated with paging over a user plane, for example, from the UPF 624 to the BS 605.

At step 1020, after performing the random access, the UE 1015 transmits a RRC connection resume request message (MSG3) to the BS 1005. The RRC connection resume request message may include a resume ID and/or a short resume Message Authentication Code-Integrity (MAC-I) (e.g., referred to as "shortResumeMAC-I"). The UE 1015 may receive the resume ID from a previous suspend procedure.

At step 1030, upon receiving the RRC connection resume request message, the BS 1005 transmits a UE context resume request message to the AMF 1022. The UE context resume request message may include the UE context for the UE 1015. In some instances, the UE context may include a S-TMSI of the UE 1015. The AMF 1022 may identify the UE 1015 based on the S-TMSI upon receiving the UE context resume request message.

At step 1040, upon receiving the UE context resume request message, the AMF 1022 may modify bearer so that data for the UE 1015 can be transported to the BS 1005 that serve the UE 1015. In this regard, the AMF 1022 and the UPF 1024 may exchange a modify bearer request message and a modify bearer response message.

At step 1050, after completing the modify bearer procedure, the AMF 1022 transmits a UE context resume response message to the BS 1005. The UE context resume response message includes a 5G-GUTI IE including a new 5G-GUTI for the UE 1015. The AMF 1022 generates the new GUTI for the UE 1015 in response to receiving the UE context resume request message. The UE context resume response message may instruct the BS 1005 to release the RRC connection with the UE 1015 after delivering the new-GUTI and the DL data to the UE 1015.

At step 1060, after modifying the bearer, the UPF 1024 transmits the DL data to the BS 1005.

At step 1070, the BS 1005 transmits a RRC connection release message (MSG4) to the UE 1015. The BS 1005 includes the DL data and the 5G-GUTI IE to the UE 1015 in the RRC connection release message.

At step 1080, after transmitting the RRC connection release message to the UE 1015, the BS 1005 performs a suspend procedure with the AMF 1022.

At step 1090, the AMF 1022 performs a modify bearer procedure with the UPF 1024 by exchanging modify bearer request and modify bearer response messages with the UPF 1024.

As can be observed, the method 1000 delivers the new 5G-GUTI to the UE 1015 by piggybacking the 5G-GUTI in a RRC connection release message. A MT-EDT UP optimization procedure does not include NAS signaling, which may be typically required for GUTI reallocation. The inclusion of the GUTI IE in the RRC connection release message allows the 1000 to deliver the new 5G-GUTI to the UE 1015 without performing a UCU procedure.

In some aspects, instead of including the 5G-GUTI IE in the UE context resume response message at step 1050, the AMF 1022 may transmit another message including the 5G-GUTI IE to the BS 1005.

While the methods 600-1000 are discussed in the context of a 5G core, similar GUTI reallocation mechanisms may be used with a EPS by replacing the AMF (e.g., the AMFs 622, 722, 822, 922, and/or 1022) with a MME and replacing the UPF (e.g., the UPFs 624, 724, 824, 924, and/or 1024) with a S-GW/P-GW.

Figure 11:
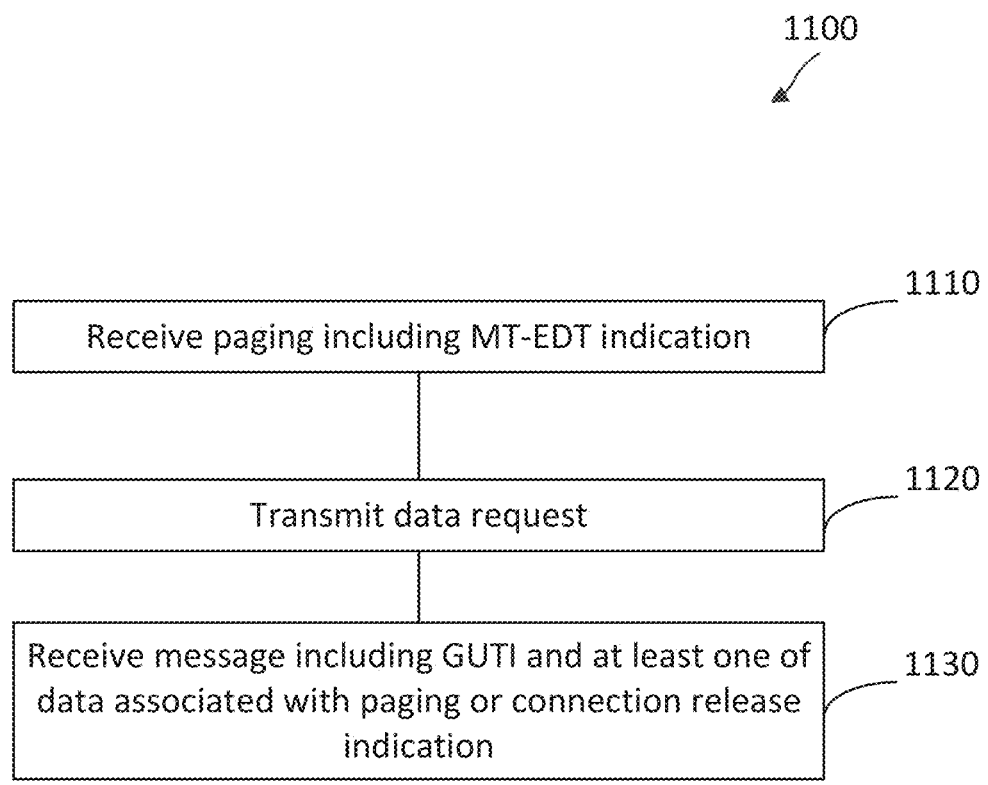
FIG. 11 is a flow diagram of a communication method according to some aspects of the present disclosure.

FIG. 11 is a flow diagram of a communication method 1100 according to some aspects of the present disclosure. Steps of the method 1100 can be executed by a computing device (e.g., a processor, processing circuit, and/or other suitable component) of a wireless communication device or other suitable means for performing the steps. For example, a wireless communication device, such as the UE 115, 215, 300, 615, 715, 815, 915, and/or 1015, may utilize one or more components, such as the processor 302, the memory 304, the MT-EDT module 308, the GUTI module 309, the transceiver 310, the modem 312, and the one or more antennas 316, to execute the steps of method 1100. The method 1100 may employ similar mechanisms as in the methods 200, 600, 700, 800, 900, and/or 1000 described above with respect to FIGS. 2, 6, 7, 8, 9, and/or 10, respectively. As illustrated, the method 1100 includes a number of enumerated steps, but aspects of the method 1100 may include additional steps before, after, and in between the enumerated steps. In some aspects, one or more of the enumerated steps may be omitted or performed in a different order.

At step 1110, the method 1100 includes receiving, by a UE from a network, a paging including a MT-EDT. In some instances, the UE may utilize one or more components, such as the processor 302, the MT-EDT module 308, the GUTI module 309, the transceiver 310, the modem 312, and the one or more antennas 316, to receive the paging.

At step 1120, the method 1100 includes transmitting, by the UE to the network, a data request in response to the paging. In some instances, the UE may utilize one or more components, such as the processor 302, the MT-EDT module 308, the GUTI module 309, the transceiver 310, the modem 312, and the one or more antennas 316, to transmit the data request.

At step 1130, the method 1100 includes receiving, by the UE from the network in response to the data request, a message including a global unique temporary identifier (GUTI) and at least one of data associated with the paging or a connection release indication. In some instances, the UE may utilize one or more components, such as the processor 302, the MT-EDT module 308, the GUTI module 309, the transceiver 310, the modem 312, and the one or more antennas 316, to receive the message.

In some aspects, the step 1120 includes the transmitting the data request includes transmitting, by the UE to the network, a RRC early data request message and the step 1130 includes receiving, by the UE from the network, a RRC early data complete message including the data and the GUTI. In some aspects, the RRC early data complete message includes a NAS service accept message, and wherein the NAS service accept message includes the data and the GUTI. In some aspects, the RRC early data complete message includes a NAS service accept message including the data and an information element (IE) including the GUTI. In some aspects, the RRC early data complete message further includes a NAS ACK request and the method 1100 further includes transmitting, by the UE to the network, a NAS ACK in response to the NAS ACK request.

In some aspects, the step 1120 includes transmitting, by the UE to the network, a radio resource control (RRC) early data request message and the step 1130 includes receiving, by the UE from the network, a RRC connection release message including the connection release indication and the GUTI.

In some aspects, the step 1120 includes transmitting, by the UE to the network, a radio resource control (RRC) connection resume request message and the step 1130 includes receiving, by the UE from the network, a RRC connection release message including the connection release indication, the data, and the GUTI.

Figure 12:
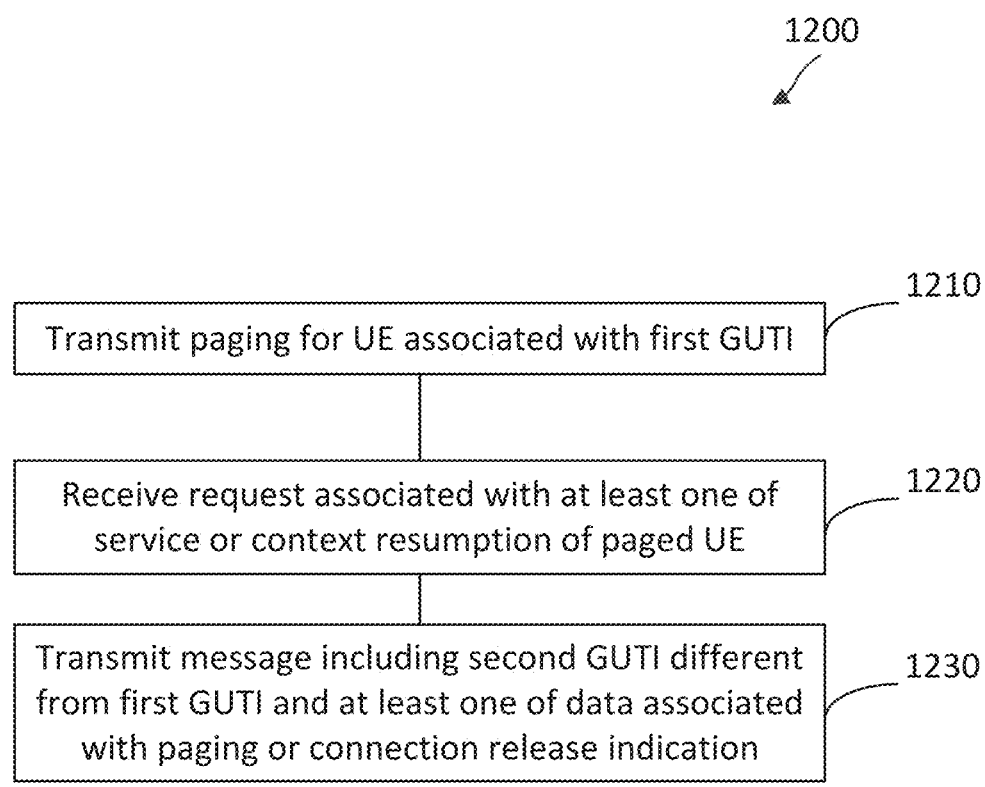
FIG. 12 is a flow diagram of a communication method according to some aspects of the present disclosure.

FIG. 12 is a flow diagram of a communication method 1200 according to some aspects of the present disclosure. Steps of the method 1200 can be executed by a computing device (e.g., a processor, processing circuit, and/or other suitable component) of a wireless communication device or other suitable means for performing the steps. For example, a core network entity, such as the network unit 500, the AMFs 222, 622, 722, 822, 922, and/or 1022, and/or the UPFs 224, 624, 724, 824, 924, and/or 1024, may utilize one or more components, such as the processor 502, the memory 504, the MT-EDT module 508, the GUTI module 509, the transceiver 510, the modem 512, and the frontend 514, to execute the steps of method 1200. The method 1200 may employ similar mechanisms as in the methods 200, 600, 700, 800, 900, and/or 1000 described above with respect to FIGS. 2, 6, 7, 8, 9, and/or 10, respectively. As illustrated, the method 1200 includes a number of enumerated steps, but aspects of the method 1200 may include additional steps before, after, and in between the enumerated steps. In some aspects, one or more of the enumerated steps may be omitted or performed in a different order.

At step 1210, the method 1200 includes transmitting, by a core network entity to a BS (e.g., the BSs 105, 205, 400, 605, 705, 805, 905, and/or 1005), a paging for a UE (e.g., the UEs 115, 215, 300, 615, 715, 815, 915, and/or 1015) associated with a first GUTI. In some instances, the core network entity may utilize one or more components, such as the processor 502, the MT-EDT module 508, the GUTI module 509, the transceiver 510, the modem 312, and the frontend 514, to transmit the paging.

At step 1220, the method 1200 includes receiving, by the core network entity from the BS, a request associated with at least one of a service or a context resumption of the paged UE. In some instances, the core network entity may utilize one or more components, such as the processor 502, the MT-EDT module 508, the GUTI module 509, the transceiver 510, the modem 312, and the frontend 514, to receive the request.

At step 1230, the method includes transmitting, by the core network entity to the BS in response to the request, a message including a second GUTI for the paged UE different from the first GUTI; and at least one of data associated with the paging or a connection release indication. In some instances, the core network entity may utilize one or more components, such as the processor 502, the MT-EDT module 508, the GUTI module 509, the transceiver 510, the modem 312, and the frontend 514, to transmit the message.

In some aspects, the method 1200 further includes generating, by the core network entity in response to the request, the second GUTI. In some instances, the core network entity may utilize one or more components, such as the processor 502 and the MT-EDT module 508, the GUTI module 509, to generate the second GUTI, for example, by selecting from a pool of values.

In some aspects, the step 1220 includes receiving, by the core network entity, an initial UE message including a NAS service request and the step 1230 includes transmitting, by the core network entity to the BS, a NAS transport message including the data and the second GUTI. In some aspects, the NAS transport message includes a NAS service accept message, and wherein the NAS service accept message includes the data and the second GUTI. In some aspects, the NAS transport message includes a NAS service accept message includes the data; and an information element (IE) including the second GUTI. In some aspects, the NAS transport message further includes a NAS acknowledgement (ACK) request and the method 1200 further includes receiving, by the core network entity from the BS, a NAS ACK in response to the NAS ACK request. In some instances, the core network entity may utilize one or more components, such as the processor 502, the MT-EDT module 508, the GUTI module 509, the transceiver 510, the modem 312, and the frontend 514, to receive the ACK.

In some aspects, the step 1220 includes receiving, by the core network entity, a UE initial message including a non-access stratum (NAS) service request and the step 1230 includes transmitting, by the core network entity to the BS, a UE context release message including the connection release indication and the second GUTI.

In some aspects, the step 1220 includes receiving, by the core network entity, a UE context resume request message and the step 1230 includes transmitting, by the core network entity to the BS, a UE context resume response message including the connection release indication and the second GUTI.

Figure 13:
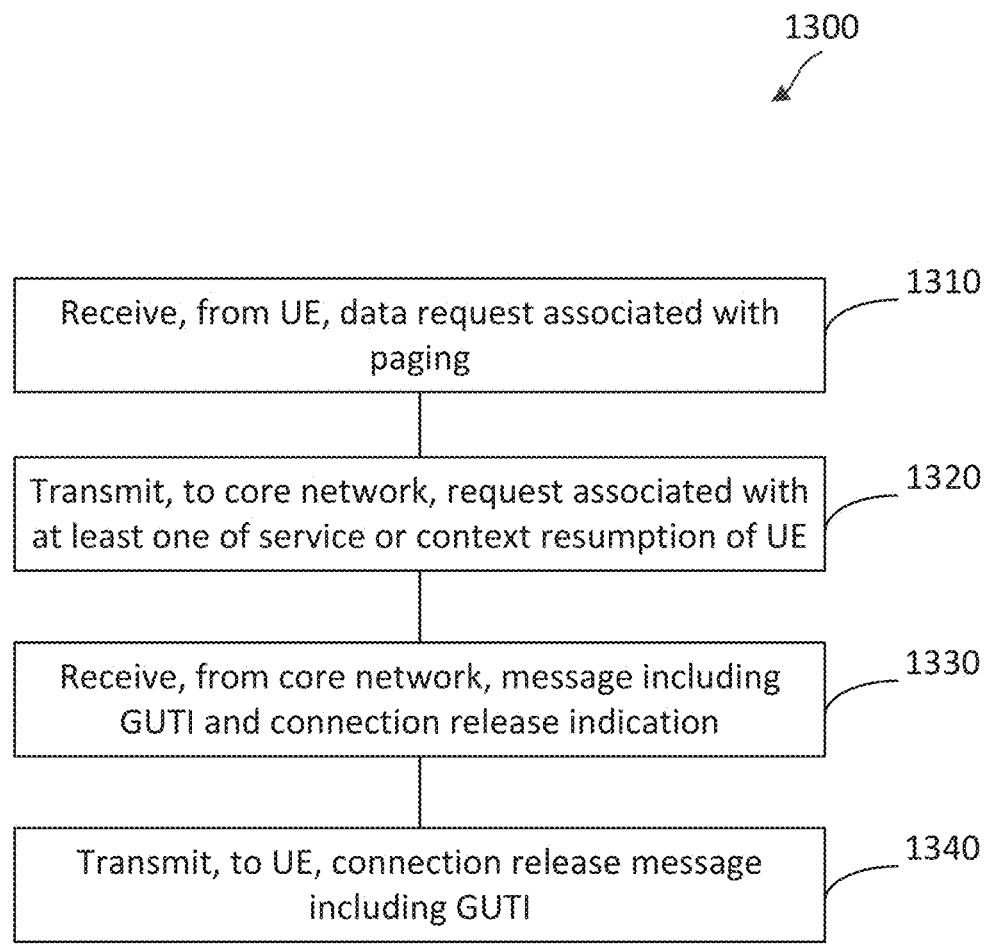
FIG. 13 is a flow diagram of a communication method according to some aspects of the present disclosure.

FIG. 13 is a flow diagram of a communication method 1300 according to some aspects of the present disclosure. Steps of the method 1300 can be executed by a computing device (e.g., a processor, processing circuit, and/or other suitable component) of a wireless communication device or other suitable means for performing the steps. For example, a wireless communication device, such as the BS 105, 205, 400, 605, 705, 805, 905, and/or 1005, may utilize one or more components, such as the processor 402, the memory 404, the MT-EDT module 408, the transceiver 410, the modem 412, and the one or more antennas 416, to execute the steps of method 1300. The method 1300 may employ similar mechanisms as in the methods 200, 600, 700, 800, 900, and/or 1000 described above with respect to FIGS. 2, 6, 7, 8, 9, and/or 10, respectively. As illustrated, the method 1300 includes a number of enumerated steps, but aspects of the method 1300 may include additional steps before, after, and in between the enumerated steps. In some aspects, one or more of the enumerated steps may be omitted or performed in a different order.

At step 1310, the method 1300 includes receiving, by a BS from a UE, a data request associated with paging. In some instances, the BS may utilize one or more components, such as the processor 402, the MT-EDT module 408, the transceiver 410, the modem 412, the RF unit 414, and the one or more antennas 416, to receive the data request.

At step 1320, the method 1300 includes transmitting, by the BS to a core network in response to the data request, a request associated with a service or a context resumption of the UE. In some instances, the BS may utilize one or more components, such as the processor 402, the MT-EDT module 408, the transceiver 410, the modem 412, the RF unit 414, and the one or more antennas 416, to transmit the request associated with the service or the context resumption of the UE.

At step 1330, the method 1300 includes receiving, by the BS from the core network in response to the request associated with the service or the context resumption of the UE, a message including a global unique temporary identifier (GUTI) and a connection release indication. In some instances, the BS may utilize one or more components, such as the processor 402, the MT-EDT module 408, the transceiver 410, the modem 412, the RF unit 414, and the one or more antennas 416, to receive the message.

At step 1340, the method 1300 includes transmitting, by the BS to the UE, a connection release message including the GUTI. In some instances, the BS may utilize one or more components, such as the processor 402, the MT-EDT module 408, the transceiver 410, the modem 412, the RF unit 414, and the one or more antennas 416, to transmit the connection release message.

In some aspects, the step 1310 includes receiving, by the BS from the UE, a radio resource control (RRC) early data request message and the step 1340 includes transmitting, by the BS to the UE, a RRC early data complete message including the GUTI.

In some aspects, the step 1330 includes receiving, by the BS from the core network, a NAS transport message including a NAS service accept message including data associated with the paging, an information element (IE) including the GUTI, and the connection release indication.

In some aspects, the step 1310 includes the receiving the data request includes receiving, by the BS from the UE, a RRC early data request message and the step 1340 includes transmitting, by the BS to the UE, a RRC connection release message including the GUTI.

In some aspects, the step 1330 includes receiving, by the BS from the core network in response, a UE context release message including the GUTI.

In some aspects, the step 1310 includes the transmitting the request includes transmitting, by the UE to the core network, a UE context resume request message and the step 1330 includes receiving, by the BS from the UE, a UE context resume response message including the GUTI and the connection release indication.

In some aspects, method 1300 includes receiving, by the BS from the core network, data associated with the paging for the UE and the step 1340 includes transmitting, by the BS to the UE, a RRC connection release message including the data and the GUTI.

Further embodiments of the present disclosure include a method of wireless communication. The method of wireless communication includes receiving, by a user equipment (UE) from a network, a paging associated with a mobile-terminated early data transmission (MT-EDT); transmitting, by the UE to the network, a data request in response to the paging; and receiving, by the UE from the network in response to the data request, a message including a global unique temporary identifier (GUTI); and at least one of data associated with the paging or a connection release indication.

The method may also include one or more of the following features. For instance, the method includes where the transmitting the data request includes transmitting, by the UE to the network, a radio resource control (RRC) early data request message; and the receiving the message includes receiving, by the UE from the network, a RRC early data complete message including the data and the GUTI. The RRC early data complete message includes a non-access stratum (NAS) service accept message, and where the NAS service accept message includes the data and the GUTI. The RRC early data complete message includes a non-access stratum (NAS) service accept message including the data; and an information element (IE) including the GUTI. The RRC early data complete message further includes a non-access stratum (NAS) acknowledgement (ACK) request, and where the method further includes transmitting, by the UE to the network, a NAS ack in response to the NAS ack request. The transmitting the data request includes transmitting, by the UE to the network, a radio resource control (RRC) early data request message; and the receiving the message includes receiving, by the UE from the network, a RRC connection release message including the connection release indication and the GUTI. The transmitting the data request includes transmitting, by the UE to the network, a radio resource control (RRC) connection resume request message; and the receiving the message includes receiving, by the UE from the network, a RRC connection release message including the connection release indication, the data, and the GUTI.

Further embodiments of the present disclosure include a method of wireless communication. The method of wireless communication includes transmitting, by a core network entity to a base station (BS), a paging for a user equipment (UE) associated with a first global unique temporary identifier (GUTI); receiving, by the core network entity from the BS, a request associated with at least one of a service or a context resumption of the paged UE; and transmitting, by the core network entity to the BS in response to the request, a message including a second GUTI for the paged UE different from the first GUTI; and at least one of data associated with the paging or a connection release indication.

The method may also include one or more of the following features. For instance, the method includes generating, by the core network entity in response to the request, the second GUTI. The receiving the request includes receiving, by the core network entity, an initial UE message including a non-access stratum (NAS) service request; and the transmitting the message includes transmitting, by the core network entity to the BS, a NAS transport message including the data and the second GUTI. The NAS transport message includes a NAS service accept message, and where the NAS service accept message includes the data and the second GUTI. The NAS transport message includes a non-access stratum (NAS) service accept message including the data; and an information element (IE) including the second GUTI. The NAS transport message further includes a NAS acknowledgement (ACK) request, and where the method further includes receiving, by the core network entity from the BS, a NAS ack in response to the NAS ack request. The receiving the request includes receiving, by the core network entity, a UE initial message including a non-access stratum (NAS) service request; and the transmitting the message includes transmitting, by the core network entity to the BS, a UE context release message including the connection release indication and the second GUTI. The receiving the request includes receiving, by the core network entity, a UE context resume request message; and the transmitting the message includes transmitting, by the core network entity to the BS, a UE context resume response message including the connection release indication and the second GUTI.

Further embodiments of the present disclosure include a method of wireless communication. The method of wireless communication includes receiving, by a base station (BS) from a user equipment (UE), a data request associated with paging; transmitting, by the BS to a core network in response to the data request, a request associated with a service or a context resumption of the UE; receiving, by the BS from the core network in response to the request associated with the service or the context resumption of the UE, a message including a global unique temporary identifier (GUTI) and a connection release indication. The method of wireless communication also includes transmitting, by the BS to the UE, a connection release message including the GUTI.

The method may also include one or more of the following features. For instance, the method includes where the receiving the data request includes receiving, by the BS from the UE, a radio resource control (RRC) early data request message; and the transmitting the connection release message includes transmitting, by the BS to the UE, a RRC early data complete message including the GUTI. The receiving the message includes receiving, by the BS from the core network, a non-access stratum (NAS) transport message including a NAS service accept message including data associated with the paging, an information element (IE) including the GUTI, and the connection release indication. The receiving the data request includes receiving, by the BS from the UE, a radio resource control (RRC) early data request message; and the transmitting the connection release message includes transmitting, by the BS to the UE, a RRC connection release message including the GUTI. The receiving the message includes receiving, by the BS from the core network in response, a UE context release message including the GUTI. The transmitting the request includes transmitting, by the UE to the core network, a UE context resume request message; and the receiving the message includes receiving, by the BS from the UE, a UE context resume response message including the GUTI and the connection release indication. The transmitting the connection release message includes transmitting, by the BS to the UE, a RRC connection release message including the data and the GUTI.

Further embodiments of the present disclosure include a user equipment (UE). The user equipment includes a transceiver configured to receive, from a network, a paging associated with a mobile-terminated early data transmission (MT-EDT); transmit a data request in response to the paging; and receive, from the network in response to the data request, a message including a global unique temporary identifier (GUTI); and at least one of data associated with the paging or a connection release indication.

The UE may also include one or more of the following features. For instance, the UE includes where the transceiver configured to transmit the data request is further configured to transmit, to the network, a radio resource control (RRC) early data request message; and the transceiver configured to receive the message is configured to receive, from the network, a RRC early data complete message including the data and the GUTI. The RRC early data complete message includes a non-access stratum (NAS) service accept message, and where the NAS service accept message includes the data and the GUTI. The RRC early data complete message includes a non-access stratum (NAS) service accept message including the data; and an information element (IE) including the GUTI. The RRC early data complete message further includes a non-access stratum (NAS) acknowledgement (ACK) request, and where the transceiver is further configured to transmit, to the network, a NAS ack in response to the NAS ack request. The transceiver configured to transmit the data request is further configured to transmit, to the network, a radio resource control (RRC) early data request message; and the transceiver configured to receive the message is configured to receive, from the network, a RRC connection release message including the connection release indication and the GUTI. The transceiver configured to transmit the data request is further configured to transmit, to the network, a radio resource control (RRC) connection resume request message; and the transceiver configured to receive the message is configured to receive, from the network, a RRC connection release message including the connection release indication, the data, and the GUTI.

Further embodiments of the present disclosure include a core network entity. The core network entity includes a transceiver configured to transmit, to a base station (BS), a paging for a user equipment (UE) associated with a first global unique temporary identifier (GUTI); receive, from the BS, a request associated with at least one of a service or a context resumption of the paged UE; and transmit to the BS in response to the request, a message including a second GUTI for the paged UE different from the first GUTI; and at least one of data associated with the paging or a connection release indication.

The core network entity may also include one or more of the following features. For instance, the core network entity includes a processor configured to generate, in response to the request, the second GUTI. The transceiver configured to receive the request is configured to receive an initial UE message including a non-access stratum (NAS) service request; and the transceiver configured to transmit the message is configured to transmit, to the BS, a NAS transport message including the data and the second GUTI. The NAS transport message includes a NAS service accept message, and where the NAS service accept message includes the data and the second GUTI. The NAS transport message includes a non-access stratum (NAS) service accept message including the data; and an information element (IE) including the second GUTI. The NAS transport message further includes a NAS acknowledgement (ACK) request, and where the transceiver is further configured to receive, from the BS, a NAS ack in response to the NAS ack request. The transceiver configured to receive the request is configured to receive a UE initial message including a non-access stratum (NAS) service request; and the transceiver configured to transmit the message is configured to transmit, to the BS, a UE context release message including the connection release indication and the second GUTI. The transceiver configured to receive the request is configured to receive, from the BS, a UE context resume request message; and the transceiver configured to transmit the message is configured to transmit, to the BS, a UE context resume response message including the connection release indication and the second GUTI.

Further embodiments of the present disclosure include a base station (BS). The BS includes a transceiver configured to receive, from a user equipment (UE), a data request associated with paging; transmit, to a core network in response to the data request, a request associated with a service or a context resumption of the UE; receive, from the core network in response to the request associated with the service or the context resumption of the UE, a message including a global unique temporary identifier (GUTI) and a connection release indication; and transmit, to the UE, a connection release message including the GUTI.

The BS may also include one or more of the following features. For instance, the BS includes where the transceiver configured to receive the request is configured to receive, from the UE, a radio resource control (RRC) early data request message; and the transceiver configured to transmit the connection release message is configured to transmit, to the UE, a RRC early data complete message including the GUTI. The transceiver configured to receive the message is configured to receive, from the core network, a non-access stratum (NAS) transport message including a NAS service accept message including data associated with the paging, an information element (IE) including the GUTI, and the connection release indication. The transceiver configured to receive the request is configured to receive, from the UE, a radio resource control (RRC) early data request message; and the transceiver configured to transmit the connection release message is configured to transmit, to the UE, a RRC connection release message including the GUTI. The transceiver configured to receive the message is configured to receive, from the core network in response, a UE context release message including the GUTI. The transceiver configured to transmit the request is configured to transmit, to the core network, a UE context resume request message; and the transceiver configured to receive the message is configured to receive, from the UE, a UE context resume response message including the GUTI and the connection release indication. The transceiver is further configured to receive, from the core network, data associated with the paging for the UE; and the transceiver configured to transmit the connection release message is configured to transmit, to the UE, a RRC connection release message including the data and the GUTI.

Further embodiments of the present disclosure include a non-transitory computer-readable medium having program code recorded thereon. The non-transitory computer-readable medium includes code for causing a user equipment (UE) to receive, from a network, a paging associated with a mobile-terminated early data transmission (MT-EDT). The non-transitory computer-readable medium also includes code for causing the UE to transmit a data request in response to the paging. The non-transitory computer-readable medium also includes code for causing the UE to receive, from the network in response to the data request, a message including a global unique temporary identifier (GUTI), and at least one of data associated with the paging or a connection release indication.

The non-transitory computer-readable medium may also include one or more of the following features. For instance, the non-transitory computer-readable medium where the code for causing the UE to transmit the data request is further configured to transmit, to the network, a radio resource control (RRC) early data request message; and the code for causing the UE to receive the message is configured to receive, from the network, a RRC early data complete message including the data and the GUTI. The code for causing the UE to transmit the data request is further configured to transmit, to the network, a radio resource control (RRC) early data request message; and the code for causing the UE to receive the message is configured to receive, from the network, a RRC connection release message including the connection release indication and the GUTI. The code for causing the UE to transmit the data request is further configured to transmit, to the network, a radio resource control (RRC) connection resume request message; and the code for causing the UE to receive the message is configured to receive, from the network, a RRC connection release message including the connection release indication, the data, and the GUTI.

Further embodiments of the present disclosure include a non-transitory computer-readable medium having program code recorded thereon. The non-transitory computer-readable medium includes code for causing a core network entity to transmit, to a base station (BS), a paging for a user equipment (UE) associated with a first global unique temporary identifier (GUTI). The non-transitory computer-readable medium also includes code for causing the core network entity to receive, from the BS, a request associated with at least one of a service or a context resumption of the paged UE. The non-transitory computer-readable medium also includes code for causing the core network entity to transmit to the BS in response to the request, a message including a second GUTI for the paged UE different from the first GUTI, and at least one of data associated with the paging or a connection release indication.

The non-transitory computer-readable medium may also include one or more of the following features. For instance, the non-transitory computer-readable medium includes code for causing the core network entity to generate, in response to the request, the second GUTI. The code for causing the core network entity to receive the request is configured to receive an initial UE message including a non-access stratum (NAS) service request; and the code for causing the core network entity to transmit the message is configured to transmit, to the BS, a NAS transport message including the data and the second GUTI. The NAS transport message includes a NAS service accept message, and where the NAS service accept message includes the data and the second GUTI. The NAS transport message includes a non-access stratum (NAS) service accept message including the data; and an information element (IE) including the second GUTI. The NAS transport message further includes a NAS Acknowledgement (ACK) request, and where the non-transitory computer-readable medium further includes receive, from the BS, a NAS ACK in response to the NAS ACK request. The code for causing the core network entity to receive the request is configured to receive a UE initial message including a non-access stratum (NAS) service request; and the code for causing the core network entity to transmit the message is configured to transmit, to the BS, a UE context release message including the connection release indication and the second GUTI. The code for causing the core network entity to receive the request is configured to receive, from the BS, a UE context resume request message; and the code for causing the core network entity to transmit the message is configured to transmit, to the BS, a UE context resume response message including the connection release indication and the second GUTI.

Further embodiments of the present disclosure include a non-transitory computer-readable medium having program code recorded thereon. The non-transitory computer-readable medium includes code for causing a base station (BS) to receive, from a user equipment (UE), a data request associated with paging. The non-transitory computer-readable medium also includes code for causing the BS to transmit, to a core network in response to the data request, a request associated with a service or a context resumption of the UE. The non-transitory computer-readable medium also includes code for causing the BS to receive, from the core network in response to the request associated with the service or the context resumption of the UE, a message including a global unique temporary identifier (GUTI) and a connection release indication. The non-transitory computer-readable medium also includes code for causing the BS to transmit, to the UE, a connection release message including the GUTI.

The non-transitory computer-readable medium may also include one or more of the following features. For instance, the non-transitory computer-readable medium includes where the code for causing the BS to receive the request is configured to receive, from the UE, a radio resource control (RRC) early data request message; and the code for causing the BS to transmit the connection release message is configured to transmit, to the UE, a RRC early data complete message including the GUTI. The code for causing the BS to receive the message is configured to receive, from the core network, a non-access stratum (NAS) transport message including a NAS service accept message including data associated with the paging, an information element (IE) including the GUTI, and the connection release indication. The code for causing the BS to receive the request is configured to receive, from the UE, a radio resource control (RRC) early data request message; and the code for causing the BS to transmit the connection release message is configured to transmit, to the UE, a RRC connection release message including the GUTI. The code for causing the BS to receive the message is configured to receive, from the core network in response, a UE context release message including the GUTI. The code for causing the BS to transmit the request is configured to transmit, to the core network, a UE context resume request message; and the code for causing the BS to receive the message is configured to receive, from the UE, a UE context resume response message including the GUTI and the connection release indication. The code for causing the core network entity to transmit the connection release message is configured to transmit, to the UE, a RRC connection release message including the data and the GUTI.

Further embodiments of the present disclosure include a user equipment (UE) to. The user equipment includes means for receiving, from a network, a paging associated with a mobile-terminated early data transmission (MT-EDT). The user equipment also includes means for transmitting a data request in response to the paging. The user equipment also includes means for receiving, from the network in response to the data request, a message including a global unique temporary identifier (GUTI), and at least one of data associated with the paging or a connection release indication.

The UE may also include one or more of the following features. For instance, the UE includes where the means for transmitting the data request is further configured to transmit, to the network, a radio resource control (RRC) early data request message; and the means for receiving the message is configured to receive, from the network, a RRC early data complete message including the data and the GUTI. The RRC early data complete message includes a non-access stratum (NAS) service accept message, and where the NAS service accept message includes the data and the GUTI. The RRC early data complete message includes a non-access stratum (NAS) service accept message including the data; and an information element (IE) including the GUTI. The RRC early data complete message further includes a non-access stratum (NAS) Acknowledgement (ACK) request, and where the UE further includes means for transmitting, to the network, a NAS ACK in response to the NAS ACK request. The means for transmitting the data request is further configured to transmit, to the network, a radio resource control (RRC) early data request message; and the means for receiving the message is configured to receive, from the network, a RRC connection release message including the connection release indication and the GUTI. The means for transmitting the data request is further configured to transmit, to the network, a radio resource control (RRC) connection resume request message; and the means for receiving the message is configured to receive, from the network, a RRC connection release message including the connection release indication, the data, and the GUTI.

Further embodiments of the present disclosure include a core network entity. The core network entity includes means for transmitting, to a base station (BS), a paging for a user equipment (UE) associated with a first global unique temporary identifier (GUTI). The core network entity also includes means for receiving, from the BS, a request associated with at least one of a service or a context resumption of the paged UE. The core network entity also includes means for transmitting to the BS in response to the request, a message including a second GUTI for the paged UE different from the first GUTI, and at least one of data associated with the paging or a connection release indication.

The core network entity may also include one or more of the following features. For instance, the core network entity includes means for generating, in response to the request, the second GUTI. The means for receiving the request is configured to receive an initial UE message including a non-access stratum (NAS) service request; and the means for transmitting the message is configured to transmit, to the BS, a NAS transport message including the data and the second GUTI. The NAS transport message includes a NAS service accept message, and where the NAS service accept message includes the data and the second GUTI. The NAS transport message includes a non-access stratum (NAS) service accept message including the data; and an information element (IE) including the second GUTI. The NAS transport message further includes a NAS Acknowledgement (ACK) request, and where the core network entity further includes receive, from the BS, a NAS ACK in response to the NAS ACK request. The means for receiving the request is configured to receive a UE initial message including a non-access stratum (NAS) service request; and the means for transmitting the message is configured to transmit, to the BS, a UE context release message including the connection release indication and the second GUTI. The means for receiving the request is configured to receive, from the BS, a UE context resume request message; and the means for transmitting the message is configured to transmit, to the BS, a UE context resume response message including the connection release indication and the second GUTI.

Further embodiments of the present disclosure include a base station (BS). The base station includes means for receiving, from a user equipment (UE), a data request associated with paging. The base station also includes means for transmitting, to a core network in response to the data request, a request associated with a service or a context resumption of the UE. The base station also includes means for receiving, from the core network in response to the request associated with the service or the context resumption of the UE, a message including a global unique temporary identifier (GUTI) and a connection release indication. The base station also includes means for transmitting, to the UE, a connection release message including the GUTI.

The BS may also include one or more of the following features. For instance, the BS includes where the means for receiving the request is configured to receive, from the UE, a radio resource control (RRC) early data request message; and the means for transmitting the connection release message is configured to transmit, to the UE, a RRC early data complete message including the GUTI. The means for receiving the message is configured to receive, from the core network, a non-access stratum (NAS) transport message including a NAS service accept message including data associated with the paging, an information element (IE) including the GUTI, and the connection release indication. The means for receiving the request is configured to receive, from the UE, a radio resource control (RRC) early data request message; and the means for transmitting the connection release message is configured to transmit, to the UE, a RRC connection release message including the GUTI. The means for receiving the message is configured to receive, from the core network in response, a UE context release message including the GUTI. The means for transmitting the request is configured to transmit, to the core network, a UE context resume request message; and the means for receiving the message is configured to receive, from the UE, a UE context resume response message including the GUTI and the connection release indication. The means for transmitting the connection release message is configured to transmit, to the UE, a RRC connection release message including the data and the GUTI.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, by a user equipment (UE) from a network, a paging associated with a mobile-terminated early data transmission (MT-EDT);
   transmitting, by the UE to the network, a data request in response to the paging; and
   receiving, by the UE from the network in response to the data request, a message including:
   a global unique temporary identifier (GUTI); and
   at least one of data associated with the paging or a connection release indication.

2. The method of claim 1, wherein:
   the transmitting the data request includes:
   transmitting, by the UE to the network, a radio resource control (RRC) early data request message; and
   the receiving the message includes:
   receiving, by the UE from the network, a RRC early data complete message including the data and the GUTI.

3. The method of claim 2, wherein the RRC early data complete message includes a non-access stratum (NAS) service accept message, and wherein the NAS service accept message includes the data and the GUTI.

4. The method of claim 2, wherein the RRC early data complete message includes:
   a non-access stratum (NAS) service accept message including the data; and
   an information element (IE) including the GUTI.

5. The method of claim 2, wherein the RRC early data complete message further includes a non-access stratum (NAS) acknowledgement (ACK) request, and wherein the method further comprises:
   transmitting, by the UE to the network, a NAS ACK in response to the NAS ACK request.

6. The method of claim 1, wherein:
   the transmitting the data request includes:
   transmitting, by the UE to the network, a radio resource control (RRC) early data request message; and
   the receiving the message includes:
   receiving, by the UE from the network, a RRC connection release message including the connection release indication and the GUTI.

7. The method of claim 1, wherein:
   the transmitting the data request includes:
   transmitting, by the UE to the network, a radio resource control (RRC) connection resume request message; and
   the receiving the message includes:
   receiving, by the UE from the network, a RRC connection release message including the connection release indication, the data, and the GUTI.

8. A method of wireless communication, comprising:
   transmitting, by a core network entity to a base station (BS), a paging for a user equipment (UE) associated with a first global unique temporary identifier (GUTI);
   receiving, by the core network entity from the BS, a request associated with at least one of a service or a context resumption of the paged UE; and
   transmitting, by the core network entity to the BS in response to the request, a message including:
   a second GUTI for the paged UE different from the first GUTI; and
   at least one of data associated with the paging or a connection release indication.

9. The method of claim 8, further comprising:
   generating, by the core network entity in response to the request, the second GUTI.

10. The method of claim 8, wherein:
    the receiving the request includes:
    receiving, by the core network entity, an initial UE message including a non-access stratum (NAS) service request; and
    the transmitting the message includes:
    transmitting, by the core network entity to the BS, a NAS transport message including the data and the second GUTI.

11. The method of claim 10, wherein the NAS transport message includes a NAS service accept message, and wherein the NAS service accept message includes the data and the second GUTI.

12. The method of claim 10, wherein the NAS transport message includes:
 a non-access stratum (NAS) service accept message including the data; and
 an information element (IE) including the second GUTI.

13. The method of claim 10, wherein the NAS transport message further includes a NAS acknowledgement (ACK) request, and wherein the method further comprises:
 receiving, by the core network entity from the BS, a NAS ACK in response to the NAS ACK request.

14. The method of claim 8, wherein:
 the receiving the request includes:
  receiving, by the core network entity, a UE initial message including a non-access stratum (NAS) service request; and
 the transmitting the message includes:
  transmitting, by the core network entity to the BS, a UE context release message including the connection release indication and the second GUTI.

15. The method of claim 8, wherein:
 the receiving the request includes:
  receiving, by the core network entity, a UE context resume request message; and
 the transmitting the message includes:
  transmitting, by the core network entity to the BS, a UE context resume response message including the connection release indication and the second GUTI.

16. A method of wireless communication, comprising:
 receiving, by a base station (BS) from a user equipment (UE), a data request associated with paging;
 transmitting, by the BS to a core network in response to the data request, a request associated with a service or a context resumption of the UE;
 receiving, by the BS from the core network in response to the request associated with the service or the context resumption of the UE, a message including a global unique temporary identifier (GUTI) and a connection release indication; and
 transmitting, by the BS to the UE, a connection release message including the GUTI.

17. The method of claim 16, wherein:
 the receiving the data request includes:
  receiving, by the BS from the UE, a radio resource control (RRC) early data request message; and
 the transmitting the connection release message includes:
  transmitting, by the BS to the UE, a RRC early data complete message including the GUTI.

18. The method of claim 16, wherein the receiving the message includes:
 receiving, by the BS from the core network, a non-access stratum (NAS) transport message including a NAS service accept message including data associated with the paging, an information element (IE) including the GUTI, and the connection release indication.

19. The method of claim 16, wherein:
 the receiving the data request includes:
  receiving, by the BS from the UE, a radio resource control (RRC) early data request message; and
 the transmitting the connection release message includes:
  transmitting, by the BS to the UE, a RRC connection release message including the GUTI.

20. The method of claim 16, wherein the receiving the message includes:
 receiving, by the BS from the core network in response, a UE context release message including the GUTI.

21. The method of claim 16, wherein:
 the transmitting the request includes:
  transmitting, by the UE to the core network, a UE context resume request message; and
 the receiving the message includes:
  receiving, by the BS from the UE, a UE context resume response message including the GUTI and the connection release indication.

22. The method of claim 21, further comprising:
 receiving, by the BS from the core network, data associated with the paging for the UE,
 wherein the transmitting the connection release message includes:
  transmitting, by the BS to the UE, a RRC connection release message including the data and the GUTI.

23. A user equipment (UE) comprising:
 a transceiver configured to:
  receive, from a network, a paging associated with a mobile-terminated early data transmission (MT-EDT);
  transmit a data request in response to the paging; and
  receive, from the network in response to the data request, a message including:
   a global unique temporary identifier (GUTI); and
   at least one of data associated with the paging or a connection release indication.

24. The UE of claim 23, wherein:
 the transceiver configured to transmit the data request is further configured to:
  transmit, to the network, a radio resource control (RRC) early data request message; and
 the transceiver configured to receive the message is configured to:
  receive, from the network, a RRC early data complete message including the data and the GUTI.

25. The UE of claim 24, wherein the RRC early data complete message includes a non-access stratum (NAS) service accept message, and wherein the NAS service accept message includes the data and the GUTI.

26. The UE of claim 24, wherein the RRC early data complete message includes:
 a non-access stratum (NAS) service accept message including the data; and
 an information element (IE) including the GUTI.

27. The UE of claim 24, wherein the RRC early data complete message further includes a non-access stratum (NAS) acknowledgement (ACK) request, and wherein the transceiver is further configured to:
 transmit, to the network, a NAS ACK in response to the NAS ACK request.

28. The UE of claim 23, wherein:
 the transceiver configured to transmit the data request is further configured to:
  transmit, to the network, a radio resource control (RRC) early data request message; and
 the transceiver configured to receive the message is configured to:
  receive, from the network, a RRC connection release message including the connection release indication and the GUTI.

29. The UE of claim 23, wherein:
the transceiver configured to transmit the data request is
    further configured to:
    transmit, to the network, a radio resource control
        (RRC) connection resume request message; and
the transceiver configured to receive the message is
    configured to:
    receive, from the network, a RRC connection release
        message including the connection release indication,
        the data, and the GUTI.

30. The UE of claim 23, wherein the transceiver configured to receive the message is configured to:
    receive, from the network, a radio resource control (RRC)
        message including the GUTI based on a non-access
        stratum message authentication code (NAS-MAC).

\* \* \* \* \*